(12) United States Patent
Lee et al.

(10) Patent No.: US 9,342,733 B2
(45) Date of Patent: May 17, 2016

(54) FINGERPRINT SENSING AND CALIBRATION APPARATUS

(71) Applicant: SecuGen Corporation, Santa Clara, CA (US)

(72) Inventors: Dong Won Lee, San Jose, CA (US); Jae Ho Kim, San Jose, CA (US); Jae Hyeong Kim, San Ramon, CA (US); Winnie Ahn, Palo Alto, CA (US)

(73) Assignee: SecuGen Corporation, Santa Clara, CA (US)

( * ) Notice: Subject to any disclaimer, the term of this patent is extended or adjusted under 35 U.S.C. 154(b) by 0 days.

(21) Appl. No.: 14/951,312

(22) Filed: Nov. 24, 2015

(65) Prior Publication Data

US 2016/0078270 A1  Mar. 17, 2016

(51) Int. Cl.
| | |
|---|---|
| *G06K 9/00* | (2006.01) |
| *G06T 1/20* | (2006.01) |
| *H04N 5/378* | (2011.01) |
| *H04N 5/341* | (2011.01) |
| *G06T 7/00* | (2006.01) |

(52) U.S. Cl.
CPC .............. *G06K 9/0008* (2013.01); *G06K 9/001* (2013.01); *G06K 9/0004* (2013.01); *G06K 9/00046* (2013.01); *G06T 1/20* (2013.01); *G06T 7/0002* (2013.01); *G06T 7/0018* (2013.01); *H04N 5/341* (2013.01); *H04N 5/378* (2013.01)

(58) Field of Classification Search
None
See application file for complete search history.

(56) References Cited

U.S. PATENT DOCUMENTS

| | | | | |
|---|---|---|---|---|
| 3,622,989 | A * | 11/1971 | Dowdy, Sr. ........ | G06K 9/00013 382/126 |
| 2013/0120760 | A1* | 5/2013 | Raguin .................. | G01B 11/24 356/612 |
| 2016/0050378 | A1* | 2/2016 | Wu ....................... | H04N 5/3696 348/77 |

\* cited by examiner

*Primary Examiner* — Stephen R Koziol
*Assistant Examiner* — Sean Conner
(74) *Attorney, Agent, or Firm* — Silicon Valley Patent Group LLP; Thomas Chan

(57) ABSTRACT

Methods and Apparatuses are provided for a thin high contrast optical acquisition system for fingerprint recognition. In one embodiment, a method of capturing images of a fingerprint may include emitting light from a set of light sources to generate a scattered light from the fingerprint, determining a set of sensor arrays located between an inner boundary and an outer boundary from the set of light sources based on thickness and refractive index of one or more panels between the set of light sources and the fingerprint, activating the set of sensor arrays to capture the scattered light from the fingerprint, and processing the scattered light captured by the set of sensor arrays in parallel to generate a topography of the fingerprint.

18 Claims, 22 Drawing Sheets

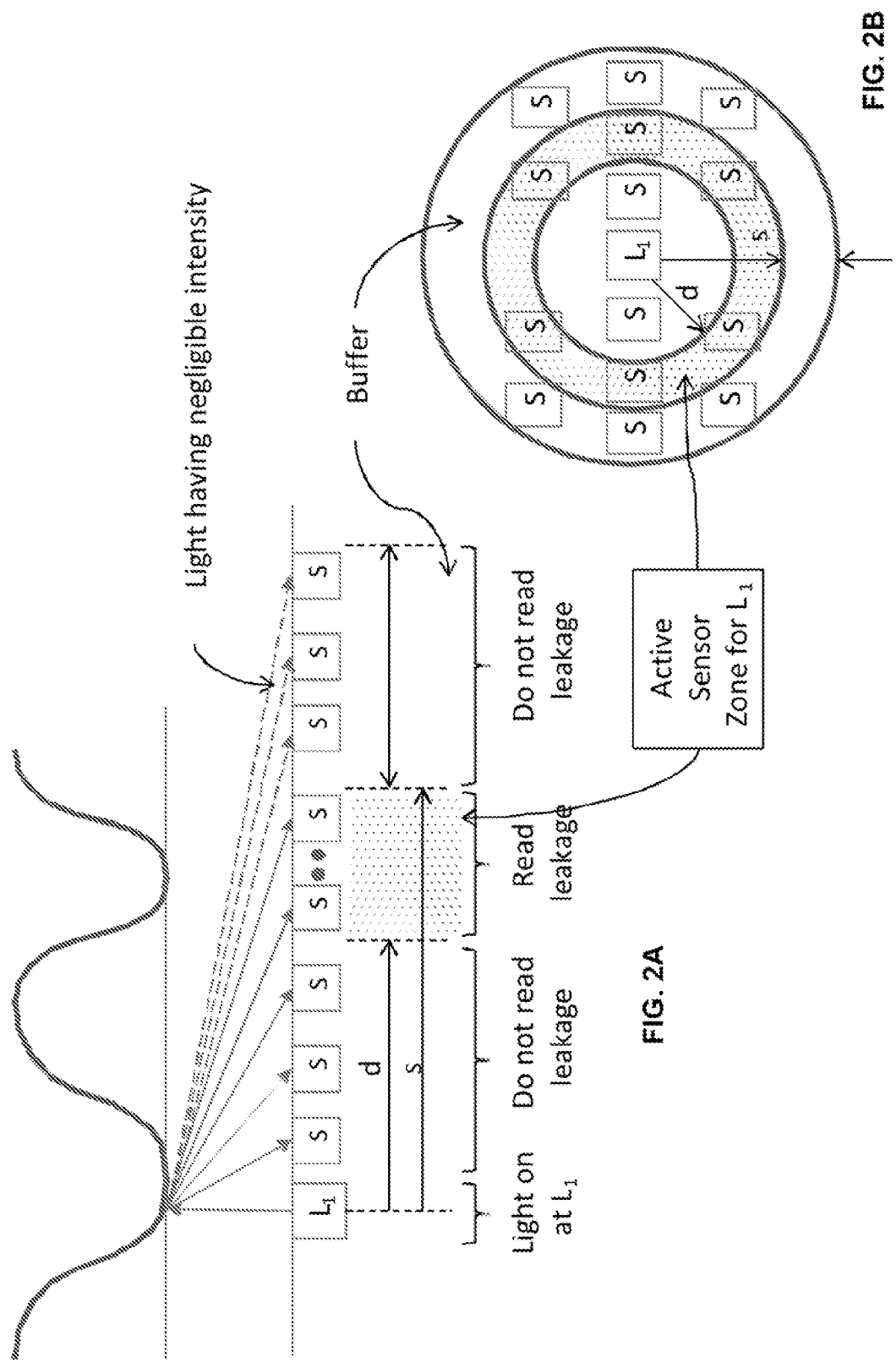

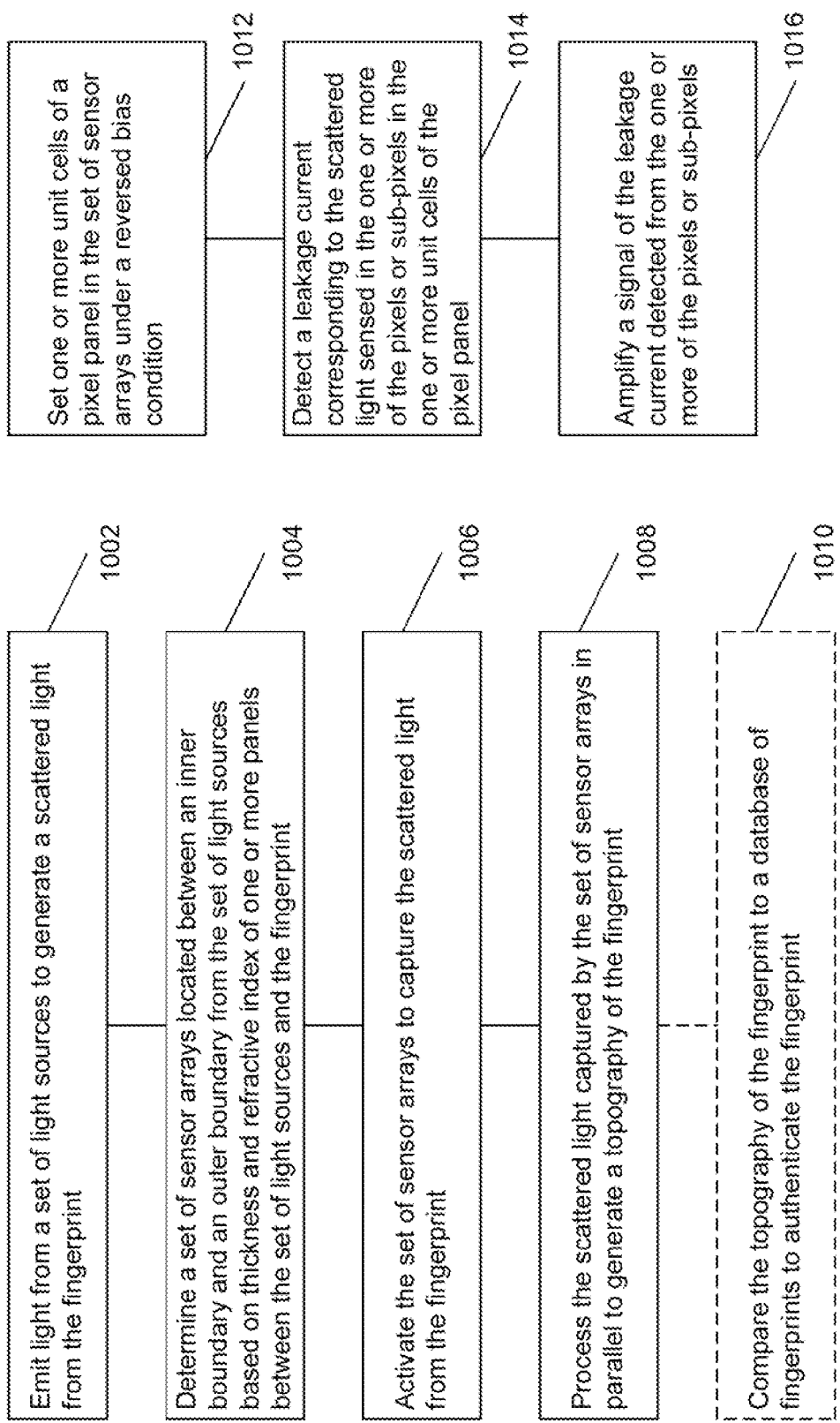

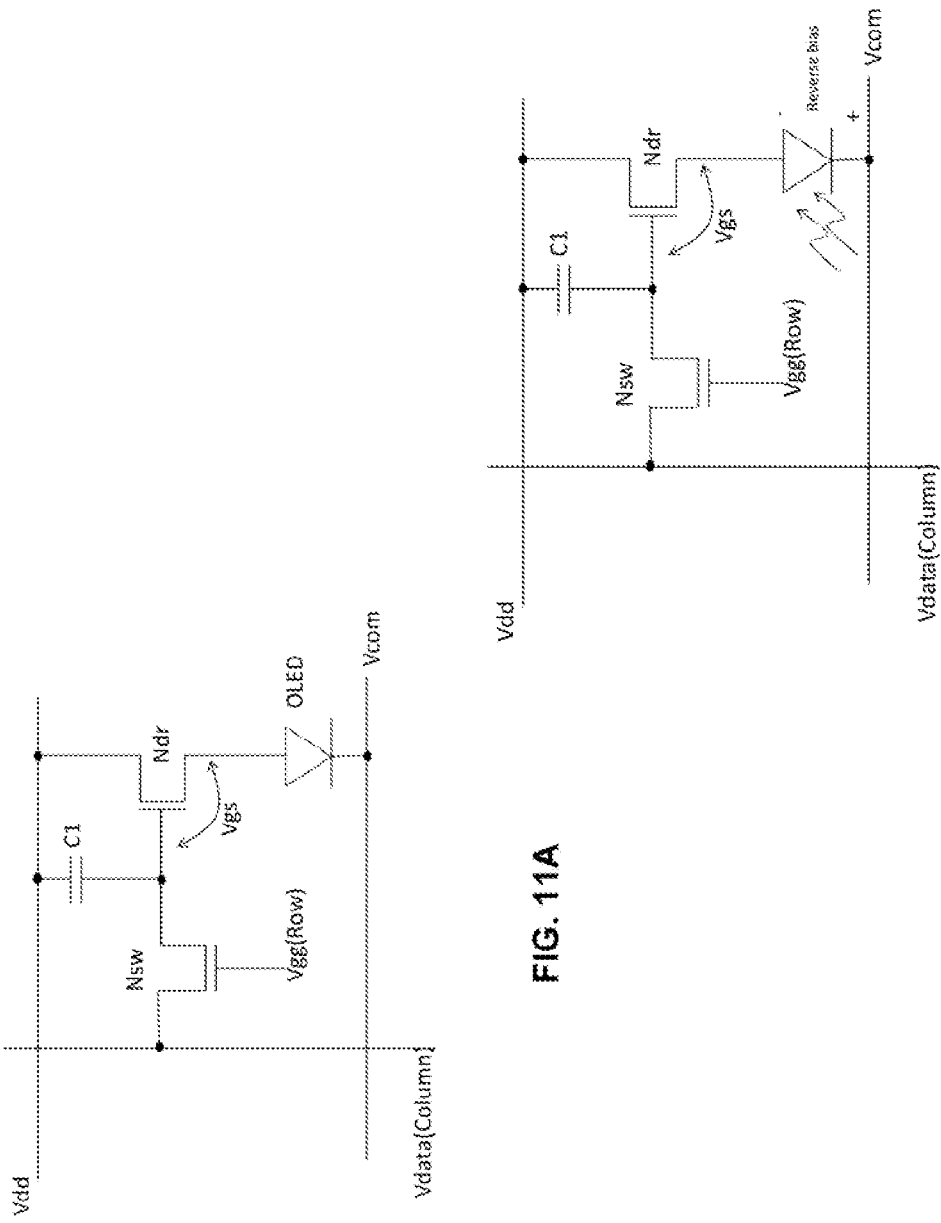
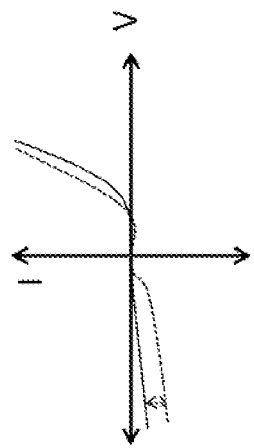
FIG. 11A
FIG. 11B

FINGERPRINT SENSING AND CALIBRATION APPARATUS

FIELD

The present invention relates to the field of fingerprint detection system. In particular, the present invention relates to methods and apparatus for capturing images of a fingerprint.

BACKGROUND

Various fingerprint recognition devices have been used for commercial and military applications. Many of such conventional fingerprint recognition devices focus on matching patterns of a captured fingerprint to an existing database of fingerprint samples. If a match is found, the fingerprint is deemed to be valid, but if a match is not found, the fingerprint is deemed to be invalid.

Applications developed for mobile devices and platforms usually require secure electronic transactions, and fingerprint recognition is starting to play an important role for making such transactions more secure as well as convenient. One of the drawbacks of using conventional fingerprint recognition devices for mobile applications is that their physical form factor is not suitable for mobile devices and mobile platforms. Either the device must be attached to the mobile device or embedded within the device. Conventional optical fingerprint acquisition devices can be bulky and it can be challenging to seamlessly integrate with mobile devices.

Therefore, it is desirable to have methods and apparatus for capturing images of a fingerprint that can address the above issues of conventional fingerprint recognition devices.

SUMMARY

Methods and systems are provided for a fingerprint sensing apparatus. In one embodiment, a method of capturing images of a fingerprint may include emitting light from a set of light sources to generate a scattered light from the fingerprint, determining a set of sensor arrays located between an inner boundary and an outer boundary from the set of light sources based on thickness and refractive index of one or more panels between the set of light sources and the fingerprint, activating the set of sensor arrays to capture the scattered light from the fingerprint, and processing the scattered light captured by the set of sensor arrays in parallel to generate a topography of the fingerprint.

In another embodiment, an apparatus for capturing images of a fingerprint includes a pixel panel having a surface configured to be touched by a fingerprint, a plurality of light sources for emitting light to the fingerprint, a plurality of sensor arrays for sensing scattered light from the fingerprint, a controller configured to generate control signals to: emit light from a set of light sources in the plurality of light sources to generate a scattered light from the fingerprint, determine a set of sensor arrays in the plurality of sensor arrays, located between an inner boundary and an outer boundary from the set of light sources, based on thickness and refractive index of one or more panels between the set of light sources and the fingerprint, activate the set of sensor arrays to capture the scattered light from the fingerprint, and process the scattered light captured by the set of sensor arrays in parallel to generate a topography of the fingerprint.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the non-limiting and non-exhaustive aspects of following drawings. Like numbers are used throughout the figures.

FIG. 2A illustrates a side view of the exemplary method of FIG. 1A; FIG. 2B illustrates a top view of the exemplary method of FIG. 1A according to aspects of the present disclosure.

FIG. 10A illustrates a method of capturing images of a fingerprint; FIG. 10B illustrates a method of activating a set of sensor array to capture scattered light from the fingerprint of FIG. 10A.

FIG. 11A illustrates an exemplary subpixel circuit cell with forward bias according to aspects of the present disclosure; FIG. 11B illustrates an exemplary subpixel circuit cell with reverse bias according to aspects of the present disclosure.

DESCRIPTION OF EMBODIMENTS

Methods and systems are provided for a fingerprint sensing apparatus. The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the scope of the disclosure. Thus, the present disclosure is not intended to be limited to the examples described and shown, but is to be accorded the scope consistent with the principles and features disclosed herein. The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

Some portions of the detailed description that follows are presented in terms of flowcharts, logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Figure 1B:
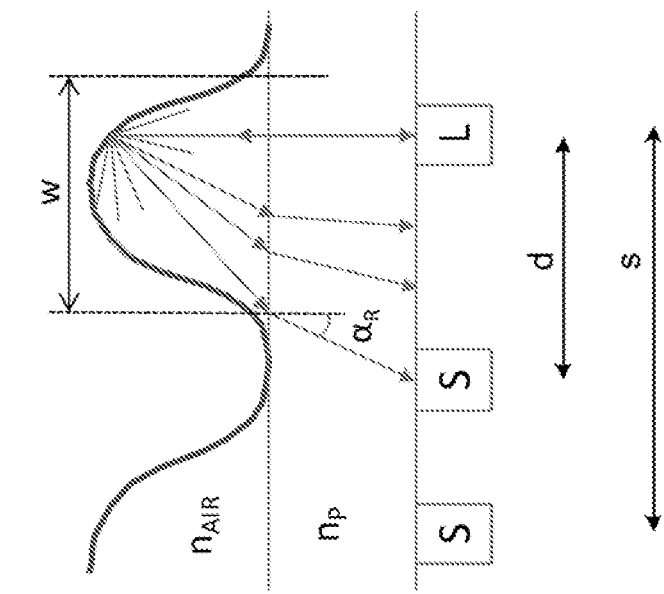
FIG. 1B illustrates light characteristics based on illumination of a valley of a fingerprint according to aspects of the present disclosure.
Figure 1A:
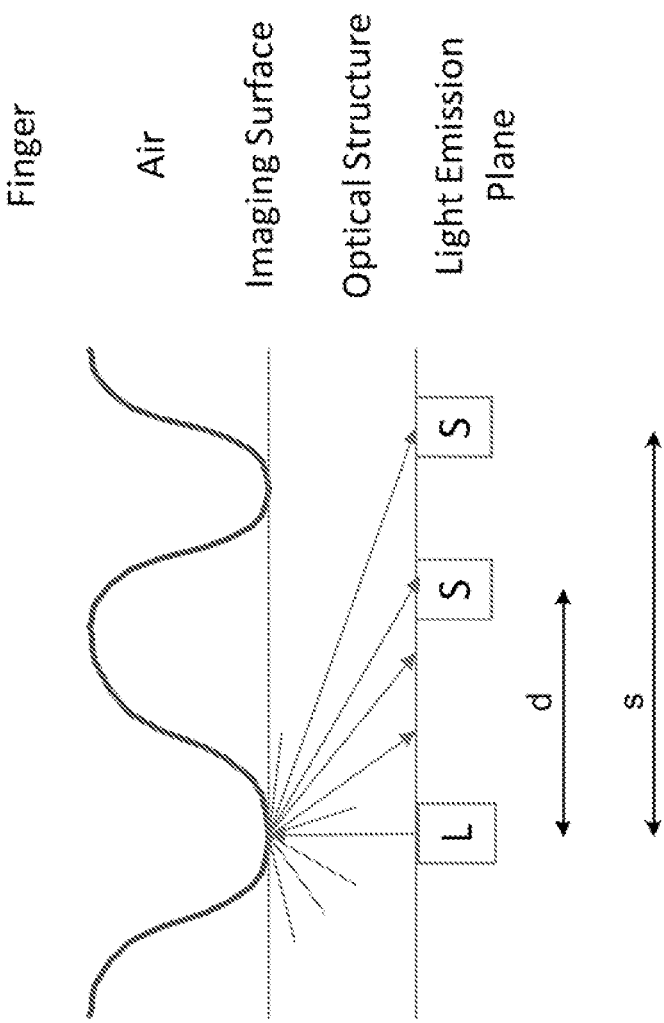
FIG. 1A illustrates light characteristics based on illumination of a ridge of a fingerprint according to aspects of the present disclosure.

FIG. 1A illustrates light characteristics based on illumination of a ridge of a fingerprint according to aspects of the present disclosure. FIG. 1B illustrates light characteristics based on illumination of a valley of a fingerprint according to aspects of the present disclosure.

The drawing of the fingerprint acquisition apparatus, as a pixel panel, in FIG. 1A shows incident light traveling from a light source component L in the light emission plane, through an optical structure to the imaging surface, and from the imaging surface to a light collecting (sensor) component S in the light emission plane. Incident light interacts with a finger placed on the imaging surface and is reflected, refracted, or scattered from the imaging surface. The pixel panel is configured so that there are multiple lighting pixels, to serve as discrete light sources, and multiple sensor pixels, to receive light carrying fingerprint image information. The light components used as light sources or sensors can be either pixels or subpixels that are arranged in an addressable pattern in the light emission plane. The pixel panel can be a display panel or non-display panel but is not limited LED or TFT-type display panels.

For a TFT (thin-film transistor) type of light refractor implemented as an add-on panel, although the light source components are located in the light source panel below the light refractor, the light emission plane can be considered as the same plane as the light collecting plane because the transparent areas of the cells of the TFT panel are aligned with the transparent areas of the cells of the light source panel. For an LED type of light refractor implemented in-cell, both the light emission plane and light collecting plane are one and the same.

The following sections describe how fingerprint images can be captured according to aspects of the present disclosure. In one approach, light is projected from one light source L onto the imaging surface at an incident angle that is less than the critical angle at the light refractor/air interface. When incident light strikes the imaging surface where a finger is placed, it will get scattered by both ridges and valleys albeit to differing degrees and intensities. Ridges will scatter light across a wider range of angles compared to the valleys. More specifically, light scattered from ridges will hit the emission plane over a larger area compared to the area hit by light scattered from valleys. The sensor zone of the present disclosure can be determined in view of the characteristics of the light scattered, and it can be configured to differentiate the light scattered by the two topographical features.

The difference in scattering range is due to the presence of air where there are valleys at the imaging surface. Since the angle of incident light is less than the critical angle, light passes out of the pixel panel, through the imaging surface into the air, strikes the valley, scatters, re-enters the pixel panel, and refracts. Because of the refraction, valleys scatter light onto the emission plane within a smaller area than that of the ridges (for example, within distance d as shown in FIG. 2A). Both valleys and ridges can scatter light into the same small area; there is no differentiation between light scattered from ridges and valleys, therefore, light is not collected in the small area close to the light source. But the ridges can scatter light outside of the small area; therefore, light is collected outside of the small area. The pixel panel provides a plurality of sensors across a controllable area to gather the well-differentiated light that is used to generate high-contrast fingerprint images.

In the example shown in FIG. 1A, the light strikes where a ridge is touching the imaging surface. Part of the incident light is absorbed by the ridge while the rest of the light is scattered towards the light emission plane. A sensor S receives a ray of the scattered light. The intensity of light received by the sensor S is assigned to the position that corresponds to the point of illumination by incident light from the light source L. The image of ridges will appear bright.

In the example shown in FIG. 1B, the light strikes the surface where there is a valley. The light passes through the surface and strikes the valley. Part of the light is absorbed by the valley while the rest of the light is scattered. Part of the scattered light re-enters the optical structure through the imaging surface and is refracted having an angle $\alpha_R$ normal to the imaging surface. A ray of refracted light hits the light emission plane at a distance x from the light source. This distance x is limited by the critical angle at the light refractor/air interface; x also depends on the depth of the valley and the thickness of the optical structure (th). Beyond a certain distance from the light source, d, no light will be refracted onto the light emission plane because the angle of refraction is limited by the critical angle. Stray light might reach beyond d but it can be ignored as its intensity would be negligible. The intensity of light received by the sensor S is assigned to the position that corresponds to the point of illumination by incident light from the light source L; therefore, a sensor located beyond d would register an image of the valley as being dark.

To distinguish between a fingerprint ridge or valley using a single light source L, the optical imaging apparatus can be configured to address individual, multiple, or regions of pixels such that when L is activated, all sensors S may be located within a predetermined distance from L at x, e.g. x<d, can be ignored, not used, or turned off, and at least one sensor S may be located at a predetermined distance from L at x, e.g. d<x<s, can be turned on, and incoming light is collected; such a sensor is called an active sensor. The active sensor will receive light scattered only from a ridge because no light scattered from a valley can be refracted by the optical structure beyond the critical angle, or beyond the distance d except for negligible stray light. The following paragraphs describe a method to calculate a value for d (also referred to as x(max)) where there is a valley at the point of illumination.

After incident light passes through the imaging surface, it strikes the valley in air and scatters. Some of this scattered light re-enters the optical structure at a distance x(air) from the axis of the original incident light and refracts in the optical structure, making an angle, $\alpha_R$, normal to the imaging surface. X(max) can be computed as: x(max)=x(air)+thickness (th)*tan($\alpha_R$).

The largest possible value for $\alpha_R$ is the critical angle at the light refractor/air interface, although $\alpha_R$ is likely to be smaller than the critical angle in practice. The largest value for x(air) is approximately the width of the valley w. Therefore, x(max) may be estimated as with the following expression: x(max)=w+thickness*tan(critical angle).

The fingerprint acquisition apparatus can be designed to have a larger x(max) to reduce detection of stray light, which would reduce the sensitivity but would be offset by greater clarity and differentiation of fingerprint ridges and valleys. In some applications, however, a smaller x(max) can be chosen to boost sensitivity without lowering contrast to intolerable levels. Since the width of a valley can vary from one point of illumination to another, in some other applications, a large enough value of x(max) is estimated to cover the possible range of valley widths that may be encountered in such applications. If there are two or more active sensors, the intensity of light received by one sensor can be compared with that received by another sensor to calculate an overall brightness that corresponds to the point of illumination.

The measured or calculated intensities of light received from various points of illumination can be assembled to map out the topography of the fingerprint corresponding to each point of illumination. Brighter areas indicate higher elevation (e.g. ridges) while darker areas indicate lower elevation (e.g. valleys).

According to aspects of the present disclosure, scattered light could be collected at a large distance beyond x (max). But it may not be practical to do so too far away for the following reasons: (a) the light intensity drops the farther away from the point of illumination, which would reduce sensitivity; (b) excessive redundant data would be generated, which would waste storage and processing resources; and/or (c) it may be advantageous to use a plurality of simultaneous light sources to speed up data collection. For faster scanning of a whole fingerprint, one approach is to illuminate more than one point from more than one light source at a time.

FIG. 2A illustrates a side view of the exemplary method of FIG. 1A; FIG. 2B illustrates a top view of the exemplary method of FIG. 1A according to aspects of the present disclosure. In some implementations, light can be projected simultaneously from two light sources, separated by a distance $x_L$, onto the imaging surface, each having an incident angle that is less than the critical angle at the light refractor/air interface. Light source L1 is located too close to light source L2 causing interference: one sensor receives light from rays scattered from two points of illumination, such as two ridges. To avoid the problems of imaging artifacts and low contrast caused by interference, $x_L$ can be large enough so that an active sensor does not receive overlapping light from rays scattered from two separate points of illumination. For example, sensors located at a distance from L less than x(max) are ignored, not used, or turned off, and at least one sensor located at a distance from light source, between d and s, where s>d, is an active sensor as shown in FIG. 2A and FIG. 2B.

The value for s can be chosen as the distance where scattered light intensity hitting the emission plane decreases to a desired threshold value, such as <20%, <10%, <5%, 1%, or <1% of the scattered light intensity hitting the emission plane at d. Beyond the distance s, lower intensity scattered light could contribute to interference if the minimum separation between two light sources is not large enough. In such applications, a buffer zone may be added beyond the active sensor(s) to avoid interference at the active sensor(s). For some other applications, if such lower intensity light is negligible, then interference may be tolerated. For some other applications, s can be chosen as slightly larger than d.

According to aspects of the present disclosure, $x_L$(min) is referred to as the minimum distance between two light sources that can be simultaneously illuminated such that at least one active sensor will not receive interference from light reflected, refracted, or scattered from the point of illumination by the other light source. In some implementations, $x_L$(min) can be estimated by using a number of models for attenuation of light intensity. In one approach, the minimum distance may be computed as $x_L$(min)=2*width of ridge+a function($1/x_S^2$). $x_S$ is the distance from a sensor to its corresponding light source L. If assuming a hemispherical model for attenuation, the intensity will decrease by $1/x_S^2$. $\alpha_S$ is the angle that a ray of scattered light received by sensor S makes with the normal to the light emission plane. If the angle of incidence to the normal of imaging surface, $\alpha_i$, is 0 degrees, then $x_S$=th*tan($\alpha_S$). The function determines how far $x_S$ can be where the intensity of light becomes negligible. To improve the contrast of the fingerprint image, the optical imaging apparatus can be configured so that light from two points of illumination do not overlap. To do so, $x_L$(min) needs to be large enough but not too large as to make it impractical. $x_L$(min) can be small enough that allow overlap of negligible light. A threshold can be determined for negligible light intensity.

In another approach, to avoid the worst case scenario of having interference from light scattered by two ridges, the minimum distance may be computed as $x_L$(min)=2*s+$x_B$. $x_B$ represents the width of a buffer zone, located between neighboring active sensor zones, in which scattered light is not sensed, the intensity of light becomes negligible, or scattered light from two points of illumination can overlap without causing interference that degrades the image. The threshold where the intensity of light becomes negligible can be determined for a particular design requirement. For example, the intensity may become negligible when it becomes <30%, <20%, <10%, <5%, 1%, or <1% of the intensity of light at d. To improve the contrast of the fingerprint image, the optical imaging apparatus can be configured so that light scattered from two points of illumination and collected in their respective active sensor zones do not overlap. To do so, $x_L$(min) needs to be large enough but not too large as to make it impractical. $x_L$(min) can be small enough to allow a tolerable overlap of negligible light for certain applications.

An active sensor zone may include one light source and at least one active sensor that will not receive interference from a point of illumination from another light source. The active sensor zone can be a circular region surrounding one light source L circumscribed by a distance s. This zone includes at least one active sensor located inside of a circular ring having an inner radius of d and an outer radius of s, where s>d, as shown in FIG. 2A and FIG. 2B.

Figure 3:
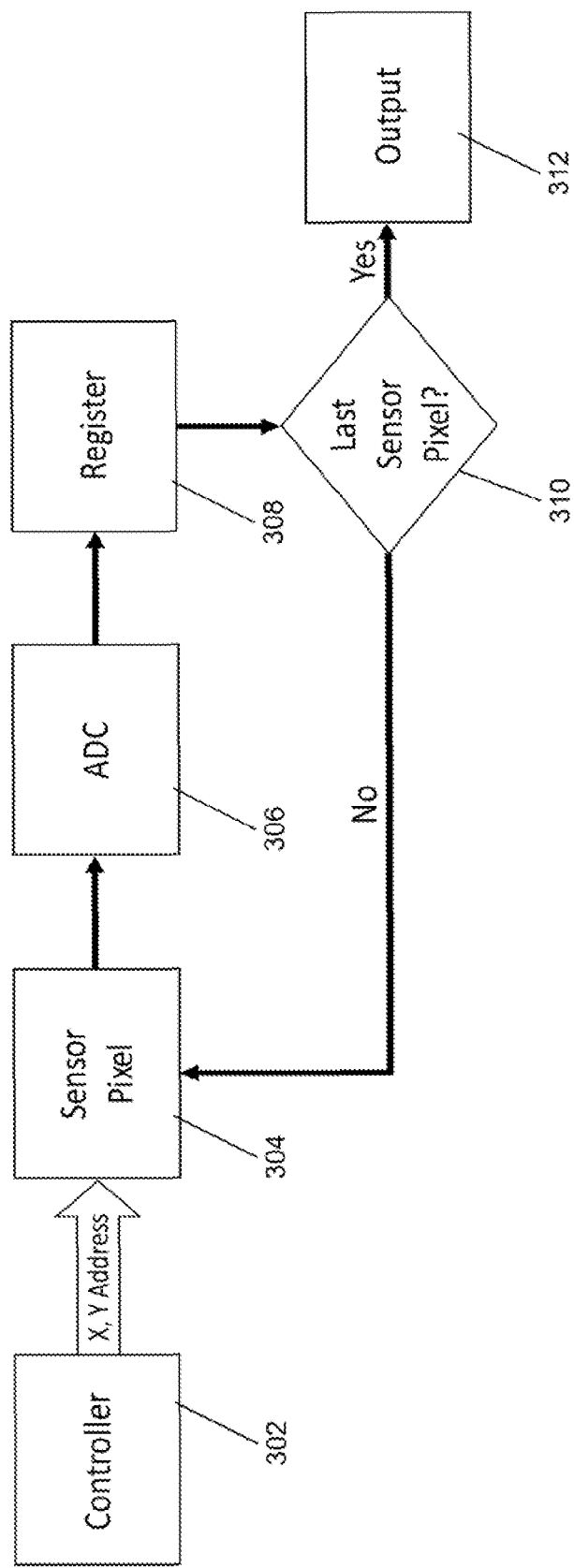
FIG. 3 illustrates a method of capturing a fingerprint image according to aspects of the present disclosure.

FIG. 3 illustrates a method of capturing a fingerprint image according to aspects of the present disclosure. In one exemplary implementation, a controller 302 assigns the address of one or more pixels to emit light to illuminate an area of a fingerprint and assigns the address of the pixels to read the light reflected from the fingerprint within a sensing area (also referred to as a sensor array), which includes one or more sensor pixels 304. An Analog-to-Digital Converter (ADC) 306 is configured to convert leakage currents from the pixels that read the reflected light into digital voltage signals. A memory, such as register 308 or a pixel array, can be configured to store the digitized signals from each pixel. In response to a last sensor pixel being detected 310, an output image 312 may be generated by an image analyzer from the stored digital signals.

In this exemplary implementation, one or more pixels can be configured to illuminate a portion of the fingerprint while one or more surrounding pixels (also refers to as a set of sensing arrays) can be configured to read the reflected light. The light of the one or more illuminating pixels can then be turned off, and a next set of one or more pixels can be turned on to illuminate the fingerprint. A next set of sensor arrays surrounding this next set of one or more pixels can then read the reflected light. This sequence of illuminating one or more pixels and reading reflected light by a set of sensor arrays of the surrounding pixels can be repeated over the sensing area to generate data for constructing an image of the fingerprint. Note that, according to aspects of the present disclosure, the term "pixel" can also mean subpixel such as an individual color subpixel found in a color LCD.

Figure 4A:
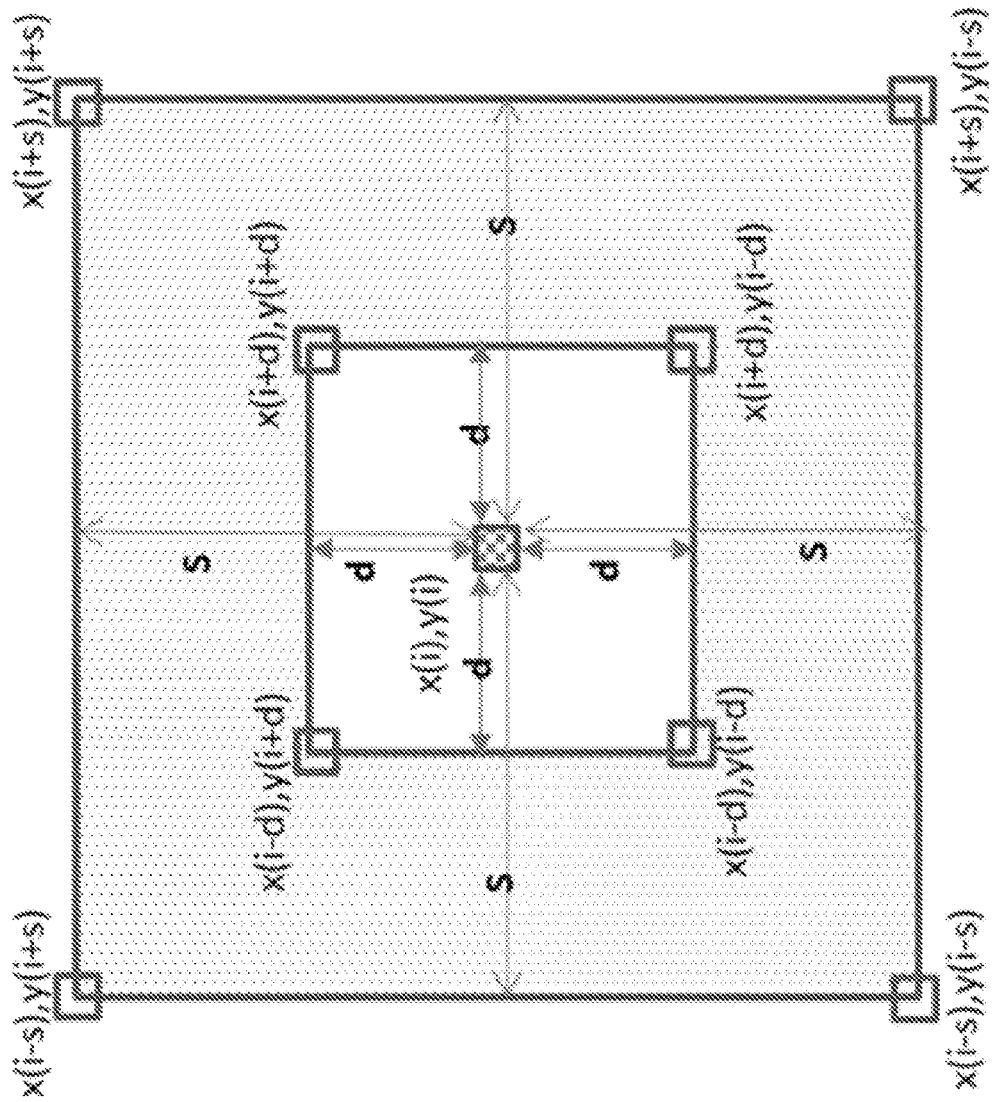
FIG. 4A illustrates an exemplary excluded area and sensing area with respect to an illuminating pixel in a point scan.
Figure 4B:
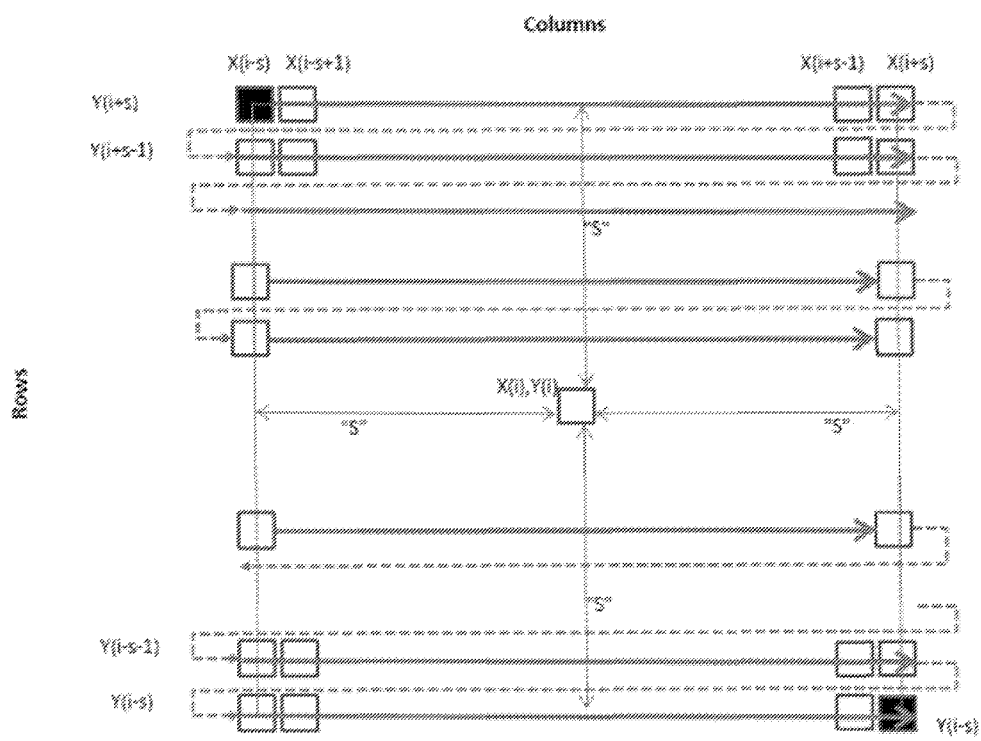
FIG. 4B illustrates a method of processing a point scan.
Figure 4C:
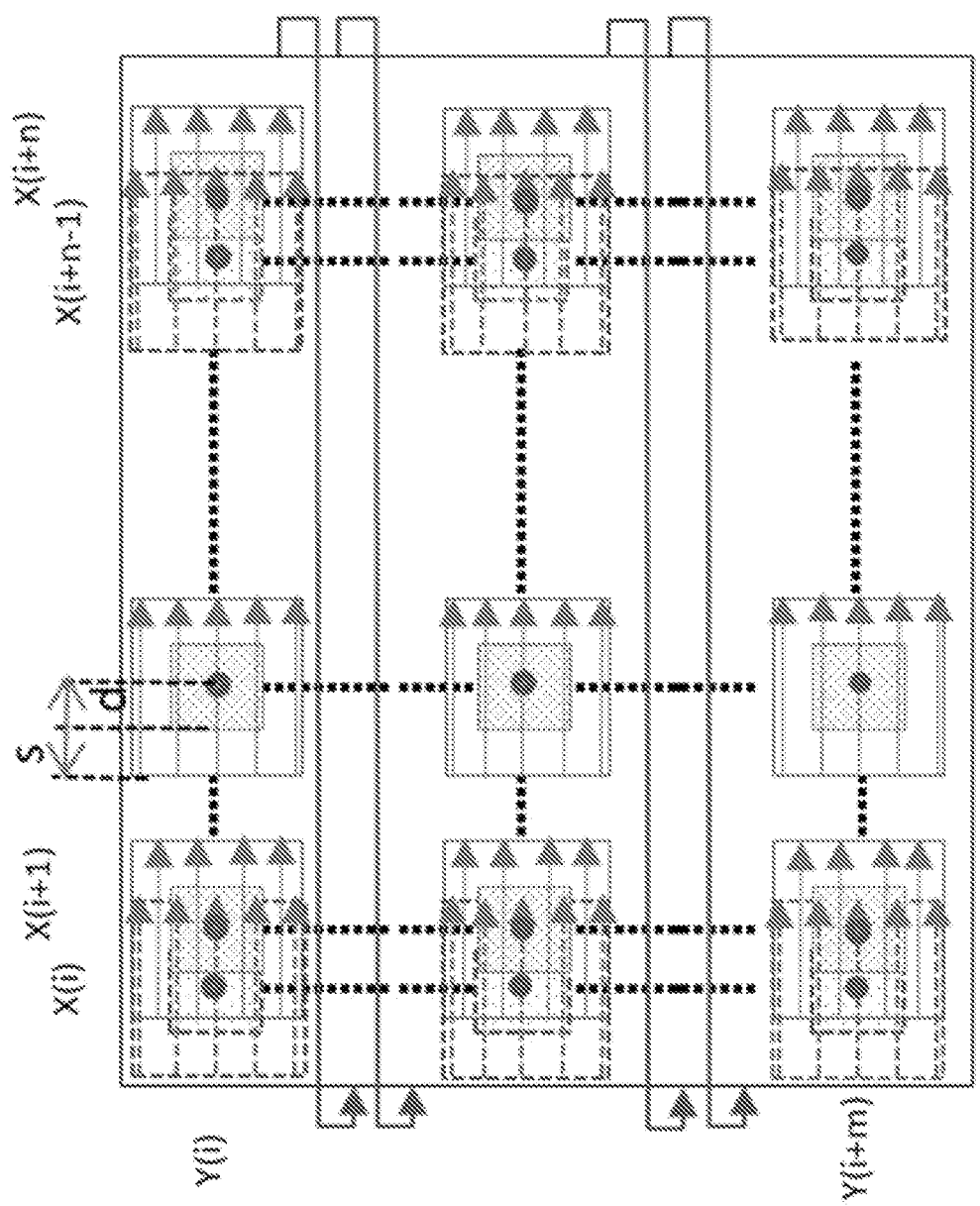
FIG. 4C illustrates a method of processing a scan area according to aspects of the present disclosure.

FIG. 4A illustrates an exemplary excluded area and sensing area with respect to an illuminating pixel in a point scan; FIG. 4B illustrates a method of processing a point scan; FIG. 4C illustrates a method of processing a scan area according to aspects of the present disclosure. According to embodiments of the present disclosure, a point scan refers to a process of illuminating a pixel (or a point) and capturing the effects of illuminating the pixel by sensing reflected and/or scattered light in the neighboring pixels. A line scan refers to a process of performing a series of point scans in a row. An area scan refers to a process of performing a series of line scans until a particular area has been scanned and processed.

In the example shown in FIG. 4A, light is first turned on in a pixel located at (X(i), Y(i)), (also refers to as the illuminating pixel). To read the light reflected from a fingerprint illuminated by light emitted from this pixel, the controller may choose a pixel within row Y(i+s) and start to read, digitize, and store the light reflected onto the pixel at column X(i−s). After finishing the operations in the column at X(i−s), the column address can move to the next pixel in the row. The light reflected onto the next pixel can be read, digitized, and stored until the last column X(i+s) of the row is reached.

After reading, digitizing, and storing the reflected light collected by pixels in all columns on row Y(i+s), the row address can move to the next row at Y(i+s−1), as shown in FIG. 4B. On row Y(i+s−1), light reflected on each pixel from column X(i−s) through the last column X(i+s) can be read, digitized, and stored. After the series of operations is completed in each row, the row address may be updated in sequence to the next row, and the series of operations can be repeated until the last row Y(i−s) is completed. After the data of the desired point scan area is acquired, the point scan is completed.

Note that, in selecting the set of sensor arrays, pixels located within a certain distance from the illuminating pixel can be excluded. In other words, the excluded data may not be used in the construction of the fingerprint image. For example, as shown in FIG. 4A, among the data obtained from a point scan illuminated by pixel (X(i), Y(i)), the data corresponding to pixels within an inner boundary, having size "2d×2d" and located within the intersections of columns X(i−d) through X(i+d) and rows Y(i+d) through Y(i−d), may be reset so that effectively, the data from those pixels would be excluded from the set of data to be used to generate one pixel of the fingerprint image. In the particular embodiment shown, when scanning a fingerprint, the distance "d" is a minimum distance between the illuminating pixel and a sensing pixel, beyond which distance where the light reflected by a fingerprint valley would be negligible compared to that reflected by a fingerprint ridge under the same illuminating conditions as the valley. When manufacturing the sensor, an initial value of "d" can be estimated as being equal to the width of a typical fingerprint valley+thickness of the optical structure*tan(critical angle at the light refractor/air interface). The outer boundary distance "s" is greater than "d" and can be made as large as practically possible. However, the value for "s" can be limited because the intensity of light reflected from the fingerprint decreases inversely with the square of the distance from the point of reflection. The initial value for "s" can be set as the shortest distance beyond which light reflected by a fingerprint ridge becomes negligible or is unable to contribute enough data to form a fingerprint image of sufficient quality.

According to aspects of the present disclosure, there are many possible variations of performing a point scan. For example, the data read at pixels near the corners of area "2d×2d" may still be used because the region outside of a distance equal to "d" may include light information that would be reflected by fingerprint ridges but not valleys. Other variations of a point scan include selective sensing (also refers to as selective reading) wherein the data from less than all pixels located outside the excluded area are used to construct the final image. Examples of different types of selective sensing regions are discussed below in association with FIGS. 6A-6F.

According to aspects of the present disclosure, scanning speed improvement and other efficiencies may be realized by sensing/reading fewer pixel data, using a method of selective sensing. The tradeoff of the resulting reduction of the total light data available to generate a good quality image may be considered. In some implementations, to compensate for reduced light data, the selective sensing data could be obtained close to the boundary of the excluded area as illustrated in FIGS. 7A-7D.

Referring to FIG. 4C, after the point scan is completed for the illumination pixel at X(i), Y(i), the controller moves to the next pixel within the same row at (X(i+1), Y(i)) and performs a point scan for illumination by this pixel. The controller repeats the point scan operation for each pixel within the same row until the last column X(i+n) is reached to complete processing the current row. After the current row is processed, the controller moves to the next row, Y(i+1), and processes the next row. After the next row is processed, the controller completes a line scan for each successive rows until the last row, Y(i+m), is reached. The series of line scans comprises an area scan. The region of the fingerprint to be scanned, described by the variables "m" and "n", may be defined and set according to specific application requirements.

Variations of the area scan may include scans where effectively a row or number of rows and/or a column or number of columns can be skipped. For example, a line scan can include point scans performed on fewer than all pixels within a given row, for example sampling at every other pixel (1 in every 2), sampling 1 in every 3 pixels, sampling 1 in every 4 pixels, etc. An area scan can include line scans performed fewer than all rows, for example, sampling every other rows (1 in every 2 rows), sampling 1 in every 3 rows, sampling 1 in every 4 rows, etc. In some implementations, the area scan can be repeated a predetermined number of times over the same area to obtain the best image data.

Figure 5A:
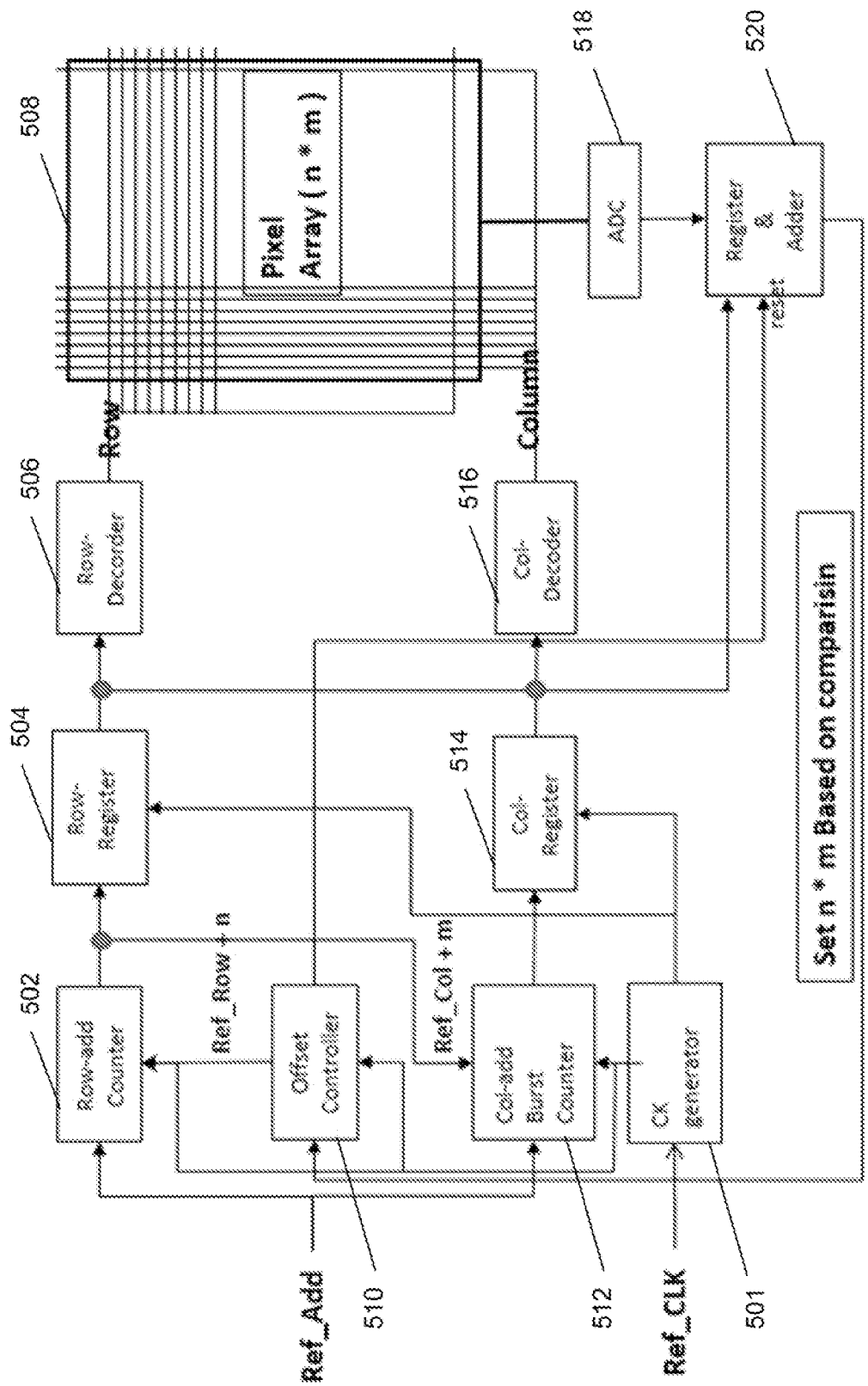
FIG. 5A illustrates an exemplary circuit for implementing a point scan.

FIG. 5A illustrates an exemplary circuit for implementing a point scan according to aspects of the present disclosure. In the exemplary implementation shown in FIG. 5A, the controller sends initial addresses containing row and column information for an array of pixels. Based on the initial address (Ref_Add), the controller starts with a row first triggered by the rising edge of a clock, generated by an internal clock generator 501. The enabling time of the row can be based on the number of clock cycles, which are established by the offset controller 510. The output of the row address counter 502 is stored in a row register 504, and then enters into a row decoder 506, which can decode the row address to select one pixel from among a row of pixels in a pixel array 508.

While the row lines are turned on, the column number, which may also be set by the offset controller 510, is turned on to get pixel information. The column number is output from the column burst address burst counter 512, is stored in a column register 514, and is entered into the column decoders 516 to select one column within the pixel array. The number of columns may also be set by the offset controller 510, which is controlled by initial values of d and s.

Each column supplies pixel information that can be converted into digital information and stored into registers, such as column register. An optional ADC 518 may be used to convert signals from pixel array 508 for use by a register and adder block 520. An operation, such as an addition, can be performed by the register and adder block 520 on registers to generate a value for one pixel image that corresponds to the initial address. Other types of operations could be performed on the registers, such as calculating the average or median value. Some of the advantages of using the addition operation are that it is efficient and it does not require extra calculations, and it yields a wide range of output values that can be used to improve image quality.

Figure 5B:
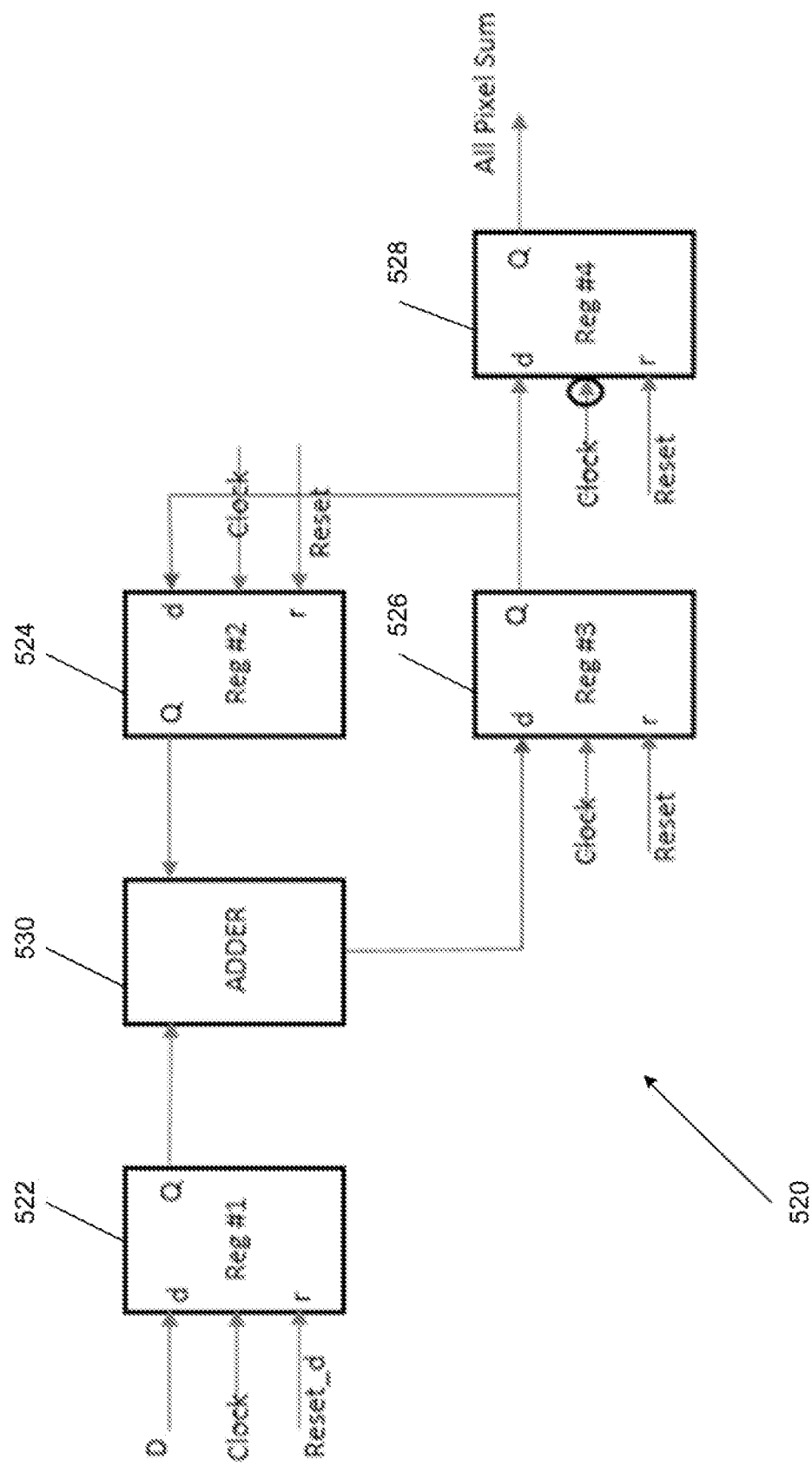
FIG. 5B illustrates an exemplary implementation for accumulating sensing data.
Figure 5C:
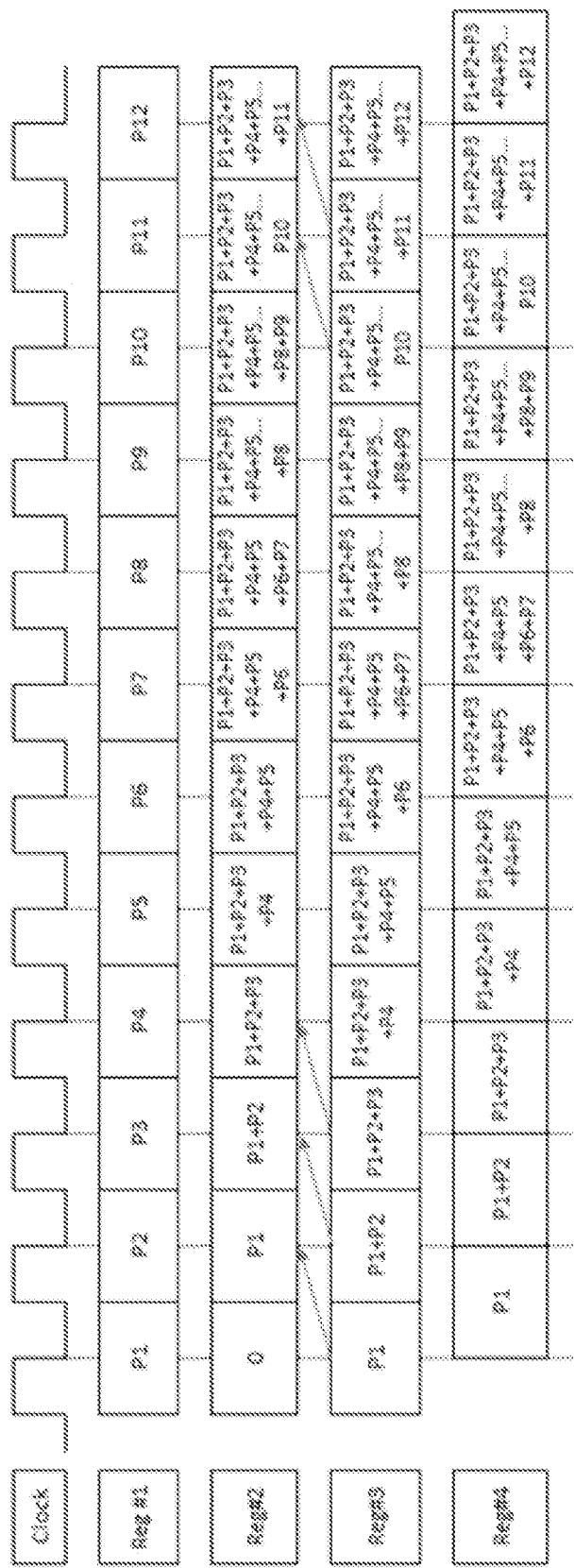
FIG. 5C illustrates an exemplary timing for implementing a point scan according to aspects of the present disclosure.

FIG. 5B illustrates an exemplary implementation for accumulating sensing data; FIG. 5C illustrates an exemplary timing for implementing a point scan according to aspects of the present disclosure. In the exemplary implementation shown in FIG. 5B, the initial values of REG #1 (522), REG #2 (524), REG #3 (526), and REG #4 (528) are set to zero. When a pixel receives light data, the controller reads out pixel information from the sensing array, and then the data is digitized and stored into REG #1 in synchronization with an internal clock. At the same cycle, the output of REG #1 and REG #2 are added using an adder 530, and the output of the adder 530 is shifted into REG #3. At the next cycle, the output of REG #3 is moved to REG #2 based on the rising edge of the clock, which can then be added with the output of REG #1. The output of register #3 is latched by the falling edge of the clock and is shifted into REG #4. The addition generates a half cycle margin, which can remove any offset timing error that may arise in the adder caused by input timing skew.

For parts of the point scan where data is excluded (i.e. being reset), a reset signal is used. The reset signal for REG #1 is called reset_d. It is generated by an offset generator (not shown) that is based on the input address and about the value of "d". Using a matching function, the reset_d signal is generated.

In one particular example, the matching block can be based on an exclusive-or function, which resets the register's data corresponding to the section of the point scan where data is to be excluded. For example, in FIG. 6A, the data within rows Y(i−d) through Y(i+d) that intersect with columns X(i−d) through X(i+d) can be reset.

At the last cycle, the controller has obtained the summation of information from all desired pixels, which can in turn be used to generate a pixel of the fingerprint image. Then, the process repeats until the entire scan area has been processed.

Figure 6E:
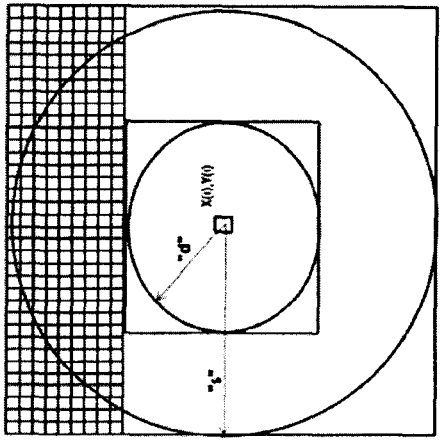
FIG. 6A-FIG. 6F illustrate exemplary implementations of collecting sensor data according to aspects of the present disclosure.
Figure 6F:
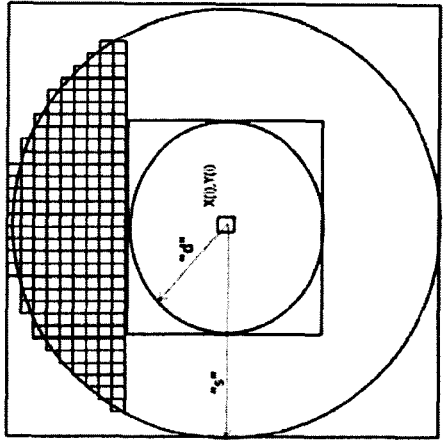
Figure 6B:
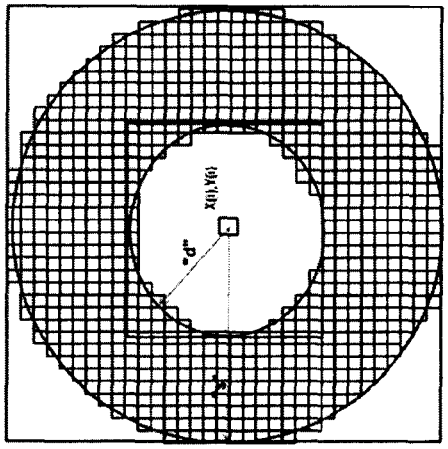
Figure 6D:
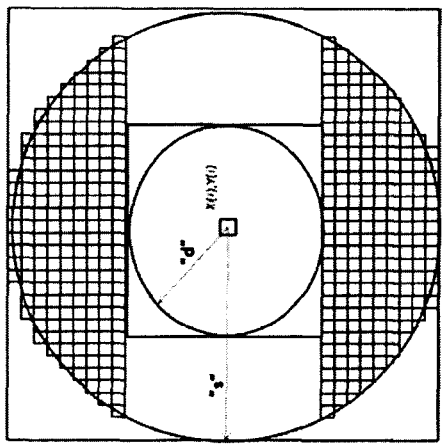
Figure 6A:
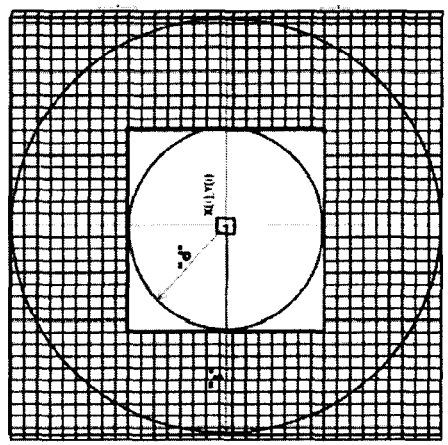
Figure 6C:
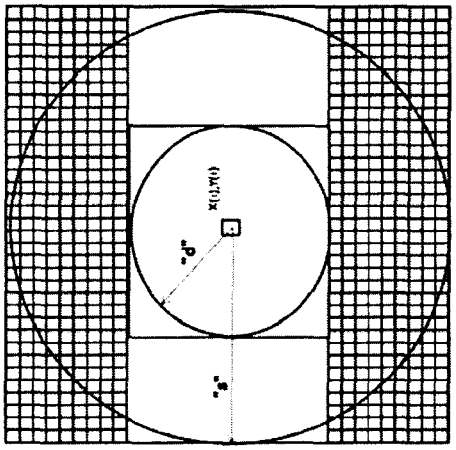

FIG. 6A-FIG. 6F illustrate exemplary implementations of collecting sensor data according to aspects of the present disclosure. The point scan area with scanning parameters "d" and "s" is shown, and the illuminating pixel is located at the center (X(i), Y(i)). In FIG. 6A, the point scan area where data can be sensed across the entire scan area 2s×2s may be read, except that the data within the excluded area 2d×2d (centered at the illuminating pixel) is reset. In FIG. 6B, a point scan where data can be sensed within a circle having a distance of s may be read, except that the data within a circle having a distance of d is reset before being added. In FIG. 6C, the point scan where data can be sensed across the entire scan area 2s×2s may be read, except that the data within entire rows that cross the area 2d×2d is not read and is reset. FIG. 6D is a variation of FIG. 6C that has additional or larger excluded areas. In FIG. 6E, the point scan where data can be sensed only across the top part of scan area 2s×2s may be read, and the data within entire rows that cross the area 2d×2d is not read and is reset. FIG. 6F is a variation of FIG. 6E that has additional or larger excluded areas.

Figure 7A:
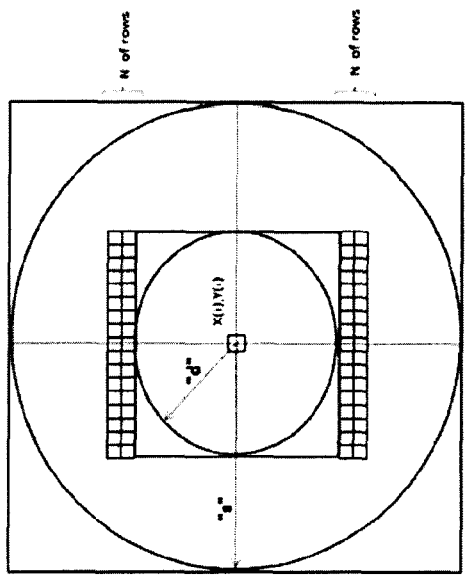
FIG. 7A-FIG. 7D illustrate other exemplary implementations of collecting sensor data according to aspects of the present disclosure.
Figure 7B:
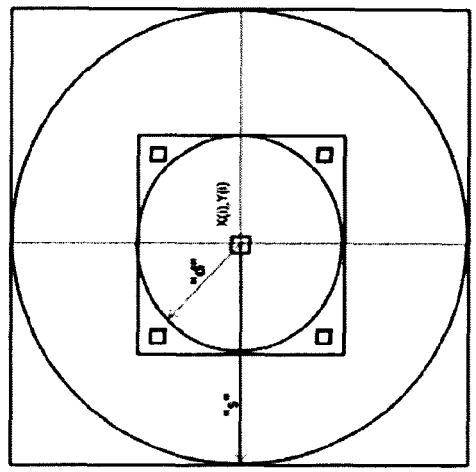
Figure 7C:
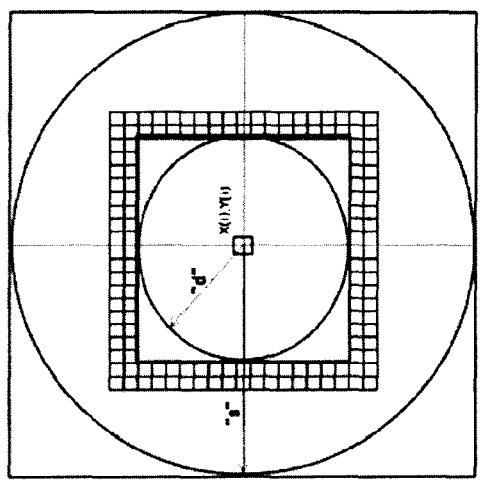
Figure 7D:
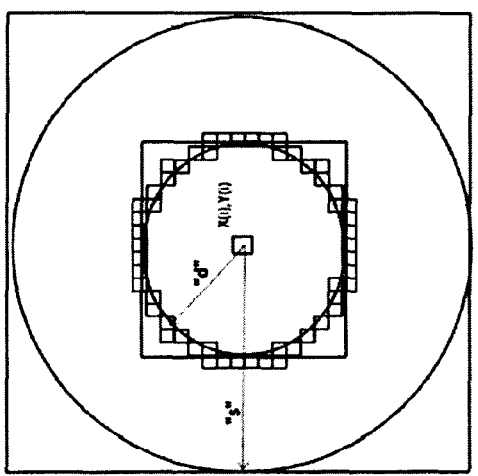

FIG. 7A-FIG. 7D illustrate other exemplary implementations of collecting sensor data according to aspects of the present disclosure. The point scan area with scanning parameters "d" and "s" is shown, and the illuminating pixel is located at the center (X(i), Y(i)). In FIG. 7A, the point scan area where data can be sensed in the neighboring pixels outside the excluded area of 2d×2d (centered at the illuminating pixel) may be read, and the data within the excluded area 2d×2d is reset. In FIG. 7B, the point scan area where data can be sensed in the neighboring pixels outside the excluded area of a circle having a radius d (centered at the illuminating pixel) may be read, and the data within the excluded area having a radius d is reset. FIG. 7C is variation of FIG. 7A having additional excluded areas. FIG. 7D is variation of FIG. 7B having additional excluded areas.

Figure 8:
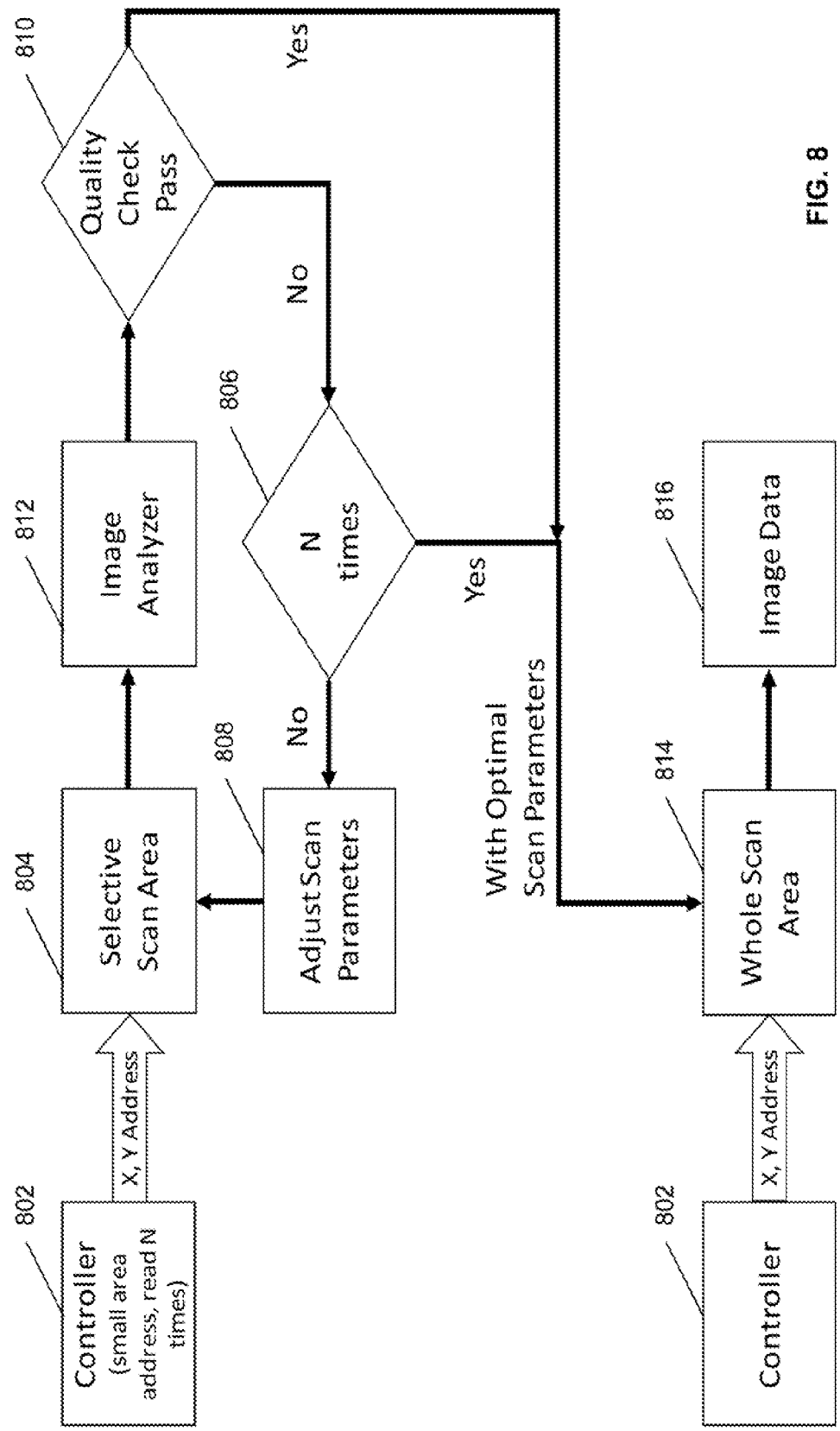
FIG. 8 illustrates a method of calibrating and optimizing the fingerprint recognition system according to aspects of the present disclosure.

FIG. 8 illustrates a method of calibrating and optimizing the fingerprint recognition system according to aspects of the present disclosure. As described earlier, the initial values for "d" and "s" can be set at the time of manufacture. The values for "d" and "s" can be further optimized by performing a point, line, or area scan with empirical data, such as with a simulated finger made from a standard material having simulated ridges and valleys or with a user's own fingerprint.

Due to variations in operating conditions and differences in fingerprint minutiae sizes between users, the values for "d" and "s" can be adjusted when the user initiates a calibration scan of his or her finger on the device. In real world applications, users often apply a protective film layer on their mobile devices. Such protective layer can negatively affect the scanning and imaging performance of the device. In such cases, a calibration scan can be performed.

In one approach, to do a calibration scan, the controller 802 can perform an area scan 804 over the entire fingerprint capture area or one or more portions thereof. This area scan may be repeated multiple times 806, such as N times, while varying one or more scan parameters 808 including "exposure time", "d" and "s" over ranges of values that can affect the image quality results, and pass the quality check 810.

After multiple times of repeated scanning 806, an image analyzer 812 can evaluate the stored data and select a combination of scan parameters that correspond to the best image data (which has passed the image quality check 810). These optimized scan parameters—"exposure time", "d" and "s"—may then be applied to the methods described below in association with FIGS. 9A-9D, and be performed over the entire fingerprint capture area 814. Finally, the image analyzer can check the stored image data for specific image quality metrics and construct the final image 816 of the fingerprint.

Figure 9A:
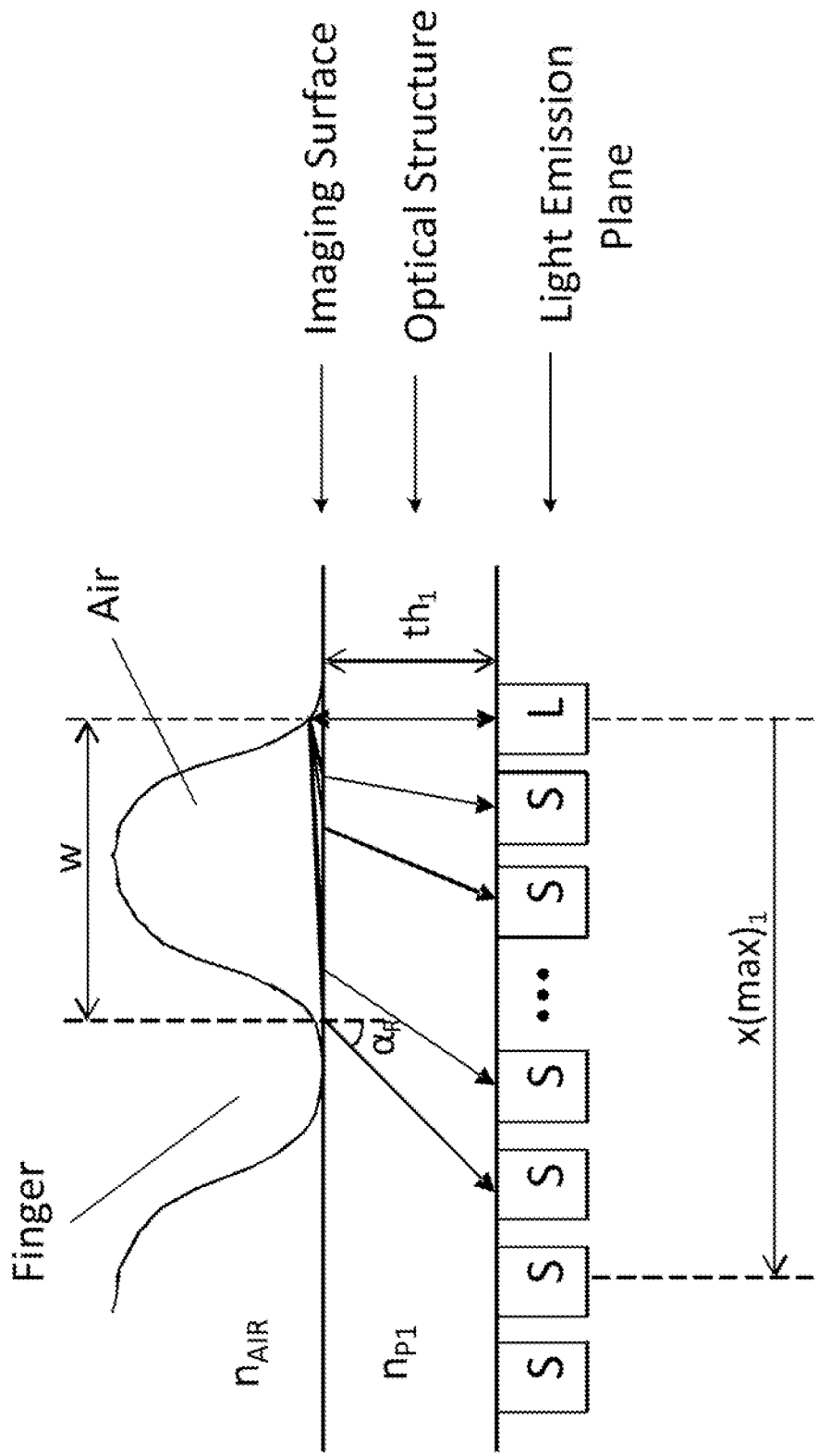
FIGS. 9A-9D illustrate embodiments of calibrating and optimizing the fingerprint recognition system according to aspects of the present disclosure.

FIGS. 9A-9D illustrate embodiments of calibrating and optimizing the fingerprint recognition system according to aspects of the present disclosure. As shown in the embodiment of FIG. 9A, the light (L) strikes the surface where there is a valley. The light passes through the surface and strikes the valley. Part of the light is absorbed by the valley while the rest of the light is scattered. Part of the scattered light re-enters the optical structure through the imaging surface and is refracted having an angle $\alpha_R$ normal to the imaging surface. A ray of refracted light hits the light emission plane at a distance from the light source. This distance can be limited by the critical angle at the light refractor/air interface; this distance also depends on the depth of the valley and the thickness of the optical structure ($th_1$). Beyond a certain distance from the light source, $x(max)_1$, no light will be refracted onto the light emission plane because the angle of refraction is limited by the critical angle. Stray light might reach beyond $x(max)_1$ but it can be ignored as its intensity would be negligible. The intensity of light received by the sensor S is assigned to the position that corresponds to the point of illumination by incident light from the light source L; therefore, a sensor located beyond $x(max)_1$ would register an image of the valley as being dark.

To calibrate the fingerprint recognition system based on the optical structure of FIG. 9A, after incident light passes through the imaging surface, it strikes the valley in air and scatters. Some of this scattered light re-enters the optical structure at a distance from the axis of the original incident light and refracts in the optical structure, making an angle, $\alpha_R$, normal to the imaging surface. $x(max)_1$ can be computed as: $x(max)_1=x(air)+thickness\ (th_1)*tan(\alpha_R)$.

The largest possible value for $\alpha_R$ is the critical angle at the light refractor/air interface, although $\alpha_R$ is likely to be smaller than the critical angle in practice. The largest value for $x(air)$ is approximately the width of the valley w. Therefore, $x(max)_1$ may be calibrated as with the following expression: $x(max)_1=w+thickness*tan(critical\ angle)$.

Note that the fingerprint acquisition apparatus can be designed to have a larger $x(max)_1$ to reduce detection of stray light, which would reduce the sensitivity but would be offset by greater clarity and differentiation of fingerprint ridges and valleys. In some applications, however, a smaller $x(max)_1$ can be chosen to boost sensitivity without lowering contrast to intolerable levels. Since the width of a valley can vary from one point of illumination to another, in some other applications, a large enough value of $x(max)_1$ is estimated to cover the possible range of valley widths that may be encountered in such applications. The measured or calculated intensities of light received from various points of illumination can be assembled to map out the topography of the fingerprint corresponding to each point of illumination. Brighter areas indicate higher elevation (e.g. ridges) while darker areas indicate lower elevation (e.g. valleys).

Figure 9B:
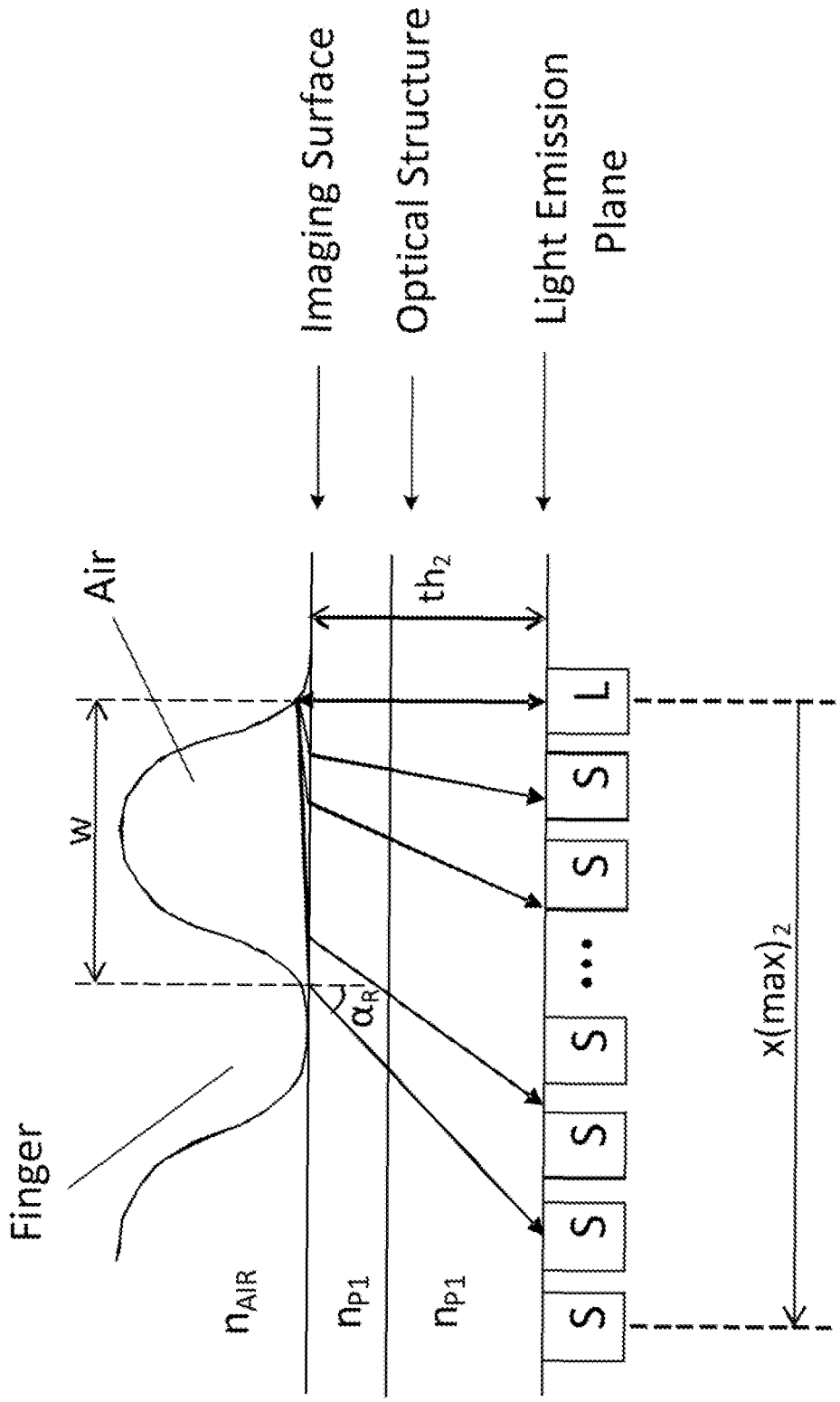
Figure 9C:
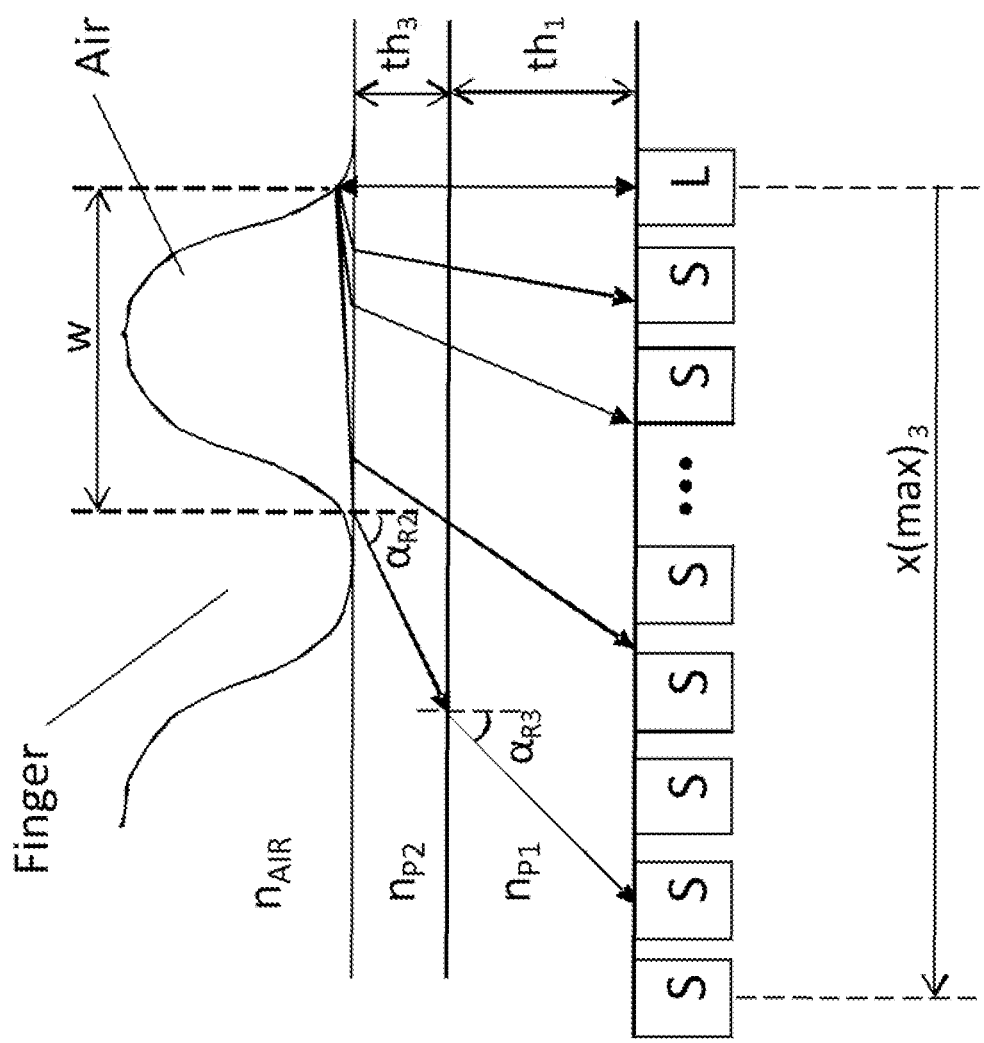
Figure 9D:
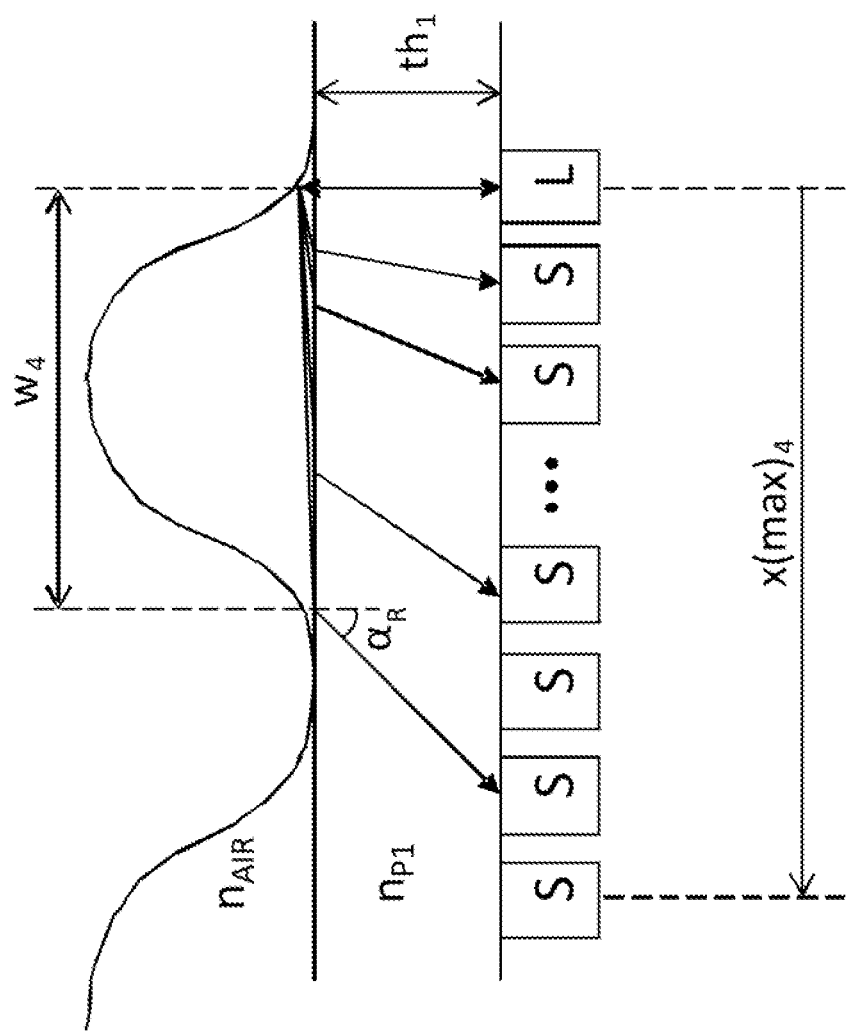

In the embodiments illustrated in FIG. 9B through FIG. 9D, changes in external conditions may have created the need to adjust $x(max)_1$ (of FIG. 9A) in order to produce good quality fingerprint images where there is enough contrast between ridges and valleys. Under these conditions, if $x(max)_1$ is not adjusted, then light reflected from valleys and unintentionally detected by active zone sensors may be misinterpreted as light reflected from ridges. External conditions include user modifications, such as placing a protective film or glass on top of the display, and user characteristics, such as fingerprints having wide valleys. In order to compensate for such external conditions, the calibration method may be employed as described in FIG. 8.

FIG. 9B illustrates an embodiment where a film is placed on top of the optical structure, and it has the same index of refraction ($n_{P1}$) as the original optical structure. As a result of the addition of the film, the thickness of the optical structure has increased to $th_2$, which would cause the $x(max)_1$ from the structure of FIG. 9A to be adjusted (calibrated) to $x(max)_2$, which may be larger than $x(max)_1$.

FIG. 9C illustrates an embodiment where a film having a different index of refraction ($n_{P2}$) is placed on top of the original optical structure, having an index of refraction ($n_{P1}$). As a result of the addition of the film, the thickness of the optical structure has increased to $th_1+th_3$. The critical angle at the interface between air and the film has changed to $\alpha_{R2}$. The critical angle at the interface between the film and the original optical structure has changed to $\alpha_{R3}$. As a result, adding this film would cause the $x(max)_1$ from the structure of FIG. 9A to be adjusted (calibrated) to $x(max)_3$, which may be larger than $x(max)_1$.

FIG. 9D illustrates an embodiment where a fingerprint having a valley width of $w_4$ is being detected, where $w_4$ is wider than w of FIG. 9A. As a result of detecting a wider valley width $w_4$, the $x(max)_1$ from the structure of FIG. 9A may be adjusted (calibrated) to $x(max)_4$, which may be larger than $x(max)_1$, to compensate for the differences in the characteristics of a user's fingerprint.

FIG. 10A illustrates a method of capturing images of a fingerprint according to aspects of the present disclosure. In the exemplary method shown in FIG. 10A, in block 1002, the method emits light from a set of light sources to generate a scattered light from the fingerprint. In block 1004, the method determines a set of sensor arrays located between an inner boundary and an outer boundary from the set of light sources based on thickness and refractive index of one or more panels between the set of light sources and the fingerprint. In block 1006, the method activates the set of sensor arrays to capture the scattered light from the fingerprint. In block 1008, the method processes the scattered light captured by the set of sensor arrays in parallel to generate a topography of the fingerprint.

In some implementations, the method may optionally include the methods performed in block 1010. In block 1010, the method compares the topography of the fingerprint to a database of fingerprints to authenticate the fingerprint. According to aspects of the present disclosure, the inner boundary and the outer boundary may be determined based on empirical data of characteristics of ridges and valleys of fingerprints from a plurality of users.

FIG. 10B illustrates a method of activating a set of sensor array to capture scattered light from the fingerprint of FIG. 10A according to aspects of the present disclosure. In block 1012, the method sets one or more unit cells of a pixel panel in the set of sensor arrays under a reversed bias condition. In block 1014, the method detects a leakage current corresponding to the scattered light sensed in the one or more of the pixels or sub-pixels in the one or more unit cells of the pixel panel. In block 1016, the method amplifies a signal of the leakage current detected from the one or more of the pixels or sub-pixels.

Figure 10C:
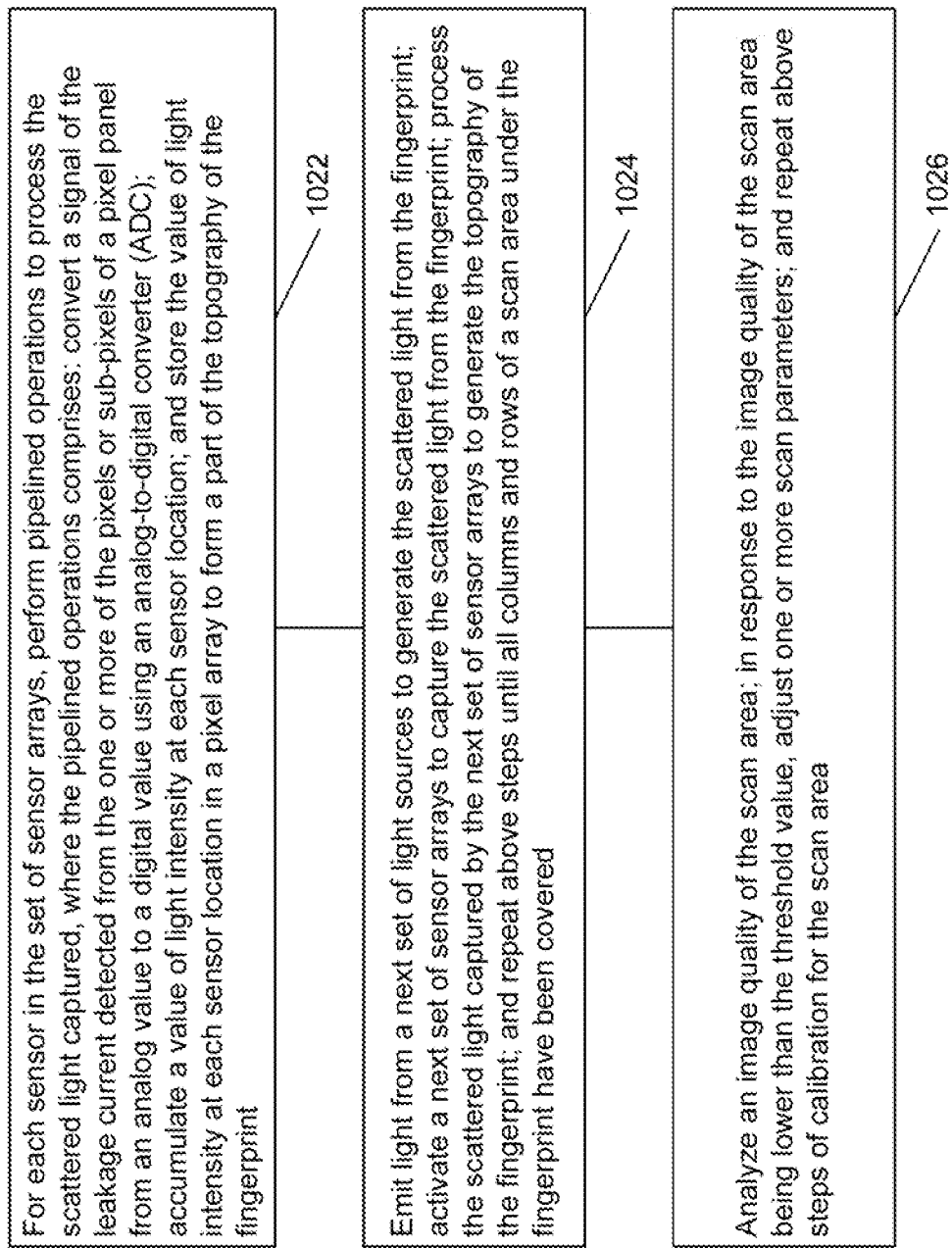
FIG. 10C illustrates a method of processing the scattered light captured by the set of sensor arrays in parallel, according to aspects of the present disclosure.

FIG. 10C illustrates a method of processing the scattered light captured by the set of sensor arrays in parallel according to aspects of the present disclosure. In the example shown in FIG. 10C, in block 1022, for each sensor in the set of sensor arrays, the method performs pipelined operations to process the scattered light captured, where the pipelined operations comprises: converts a signal of the leakage current detected from the one or more of the pixels or sub-pixels of a pixel panel from an analog value to a digital value using an analog-to-digital converter (ADC); accumulates a value of light intensity at each sensor location; and stores the value of light intensity at each sensor location in a pixel array to form a part of the topography of the fingerprint.

In block 1024, the method emits light from a next set of light sources to generate the scattered light from the fingerprint; activates a next set of sensor arrays to capture the scattered light from the fingerprint; processes the scattered light captured by the next set of sensor arrays to generate the topography of the fingerprint; and repeats above steps until all columns and rows of a scan area under the fingerprint have been covered.

In block 1026, the method analyzes an image quality of the scan area; in response to the image quality of the scan area being lower than the threshold value, adjusts one or more scan parameters; and repeats above steps of calibration for the scan area.

According to aspects of the present disclosure, the adjusting one or more scan parameters is based on a number of layers of the one or more panels, thickness and refractive index of each layer of the one or more panels, an estimated width of the fingerprint valley, an estimated width of the fingerprint ridge, or some combination thereof. The one or more scan parameters may comprise: an inner boundary distance between the set of light sources and the set of sensor array; an outer boundary distance between the set of light sources and the set of sensor array; an intensity of the set of light sources; sizes of the set of sensor arrays; shapes of the set of sensor arrays; or some combination thereof.

According to aspects of the present disclosure, an active matrix OLED (AMOLED) panel can be used as the main component of a fingerprint acquisition apparatus. An AMOLED panel may include subpixel areas (red, green, and blue subpixels) and a driving circuit area (thin film transistor and capacitor). The brightness of each subpixel can be adjusted by the driving and switching transistors and capacitors and by controlling the amount of current injected to the OLED subpixels. The dimension of subpixels can be formed using OLED material deposition techniques. For instance, the size and position of subpixels can be set by using shadow masks during the OLED material evaporation process.

An OLED may have a layered structure with the following sequence: anode/hole injection layer/hole transport layer/emissive layer/electron transport layer/electron injection layer/cathode. ITO and other transparent conducting materials having high work function can be used for anode materials, and metals such as aluminum and magnesium can be used for cathode materials. FIG. 10D shows the structure of a bottom emission OLED. In this example, the imaging surface would be at the bottom of the substrate, and the light emission plane would be the cathode layer. The optical structure may include the transparent layers between the substrate and the cathode.

Figure 12:
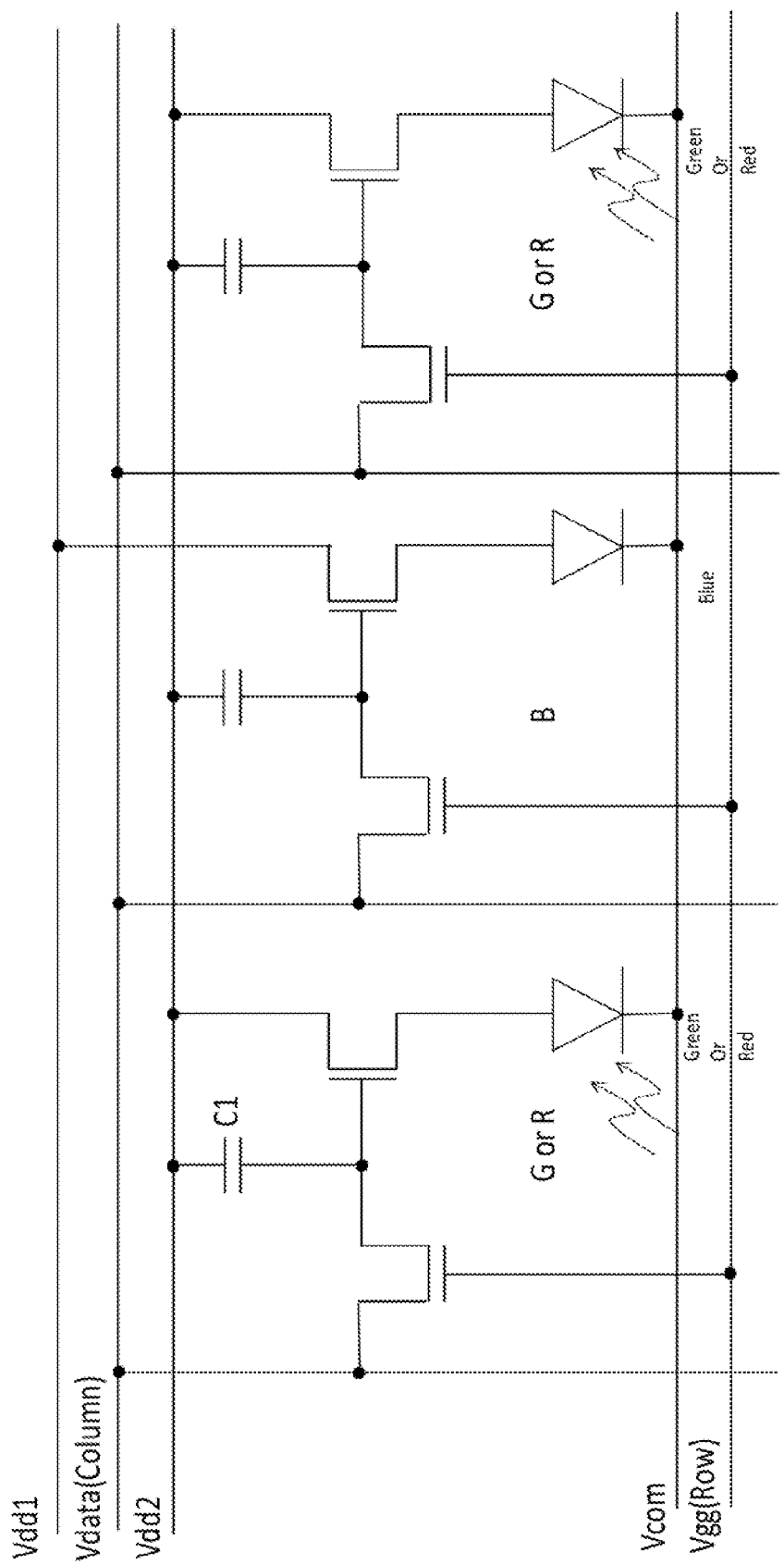
FIG. 12 illustrates an exemplary pixel circuit cell with RGB subpixels according to aspects of the present disclosure.

The reliability of such a fingerprint acquisition apparatus, i.e. the OLED panel lifetime, can be improved by using various sealing techniques and materials, such as desiccant, frit glass sealing, and thin film encapsulation. Various types of substrates such as sapphire, glass, and plastic materials can be used for OLED carriers in order to control the light travel path (refractive index control), to enhance/improve signal to noise ratio of image sensing, and to improve the reliability and lifetime of fingerprint apparatus. FIG. 11A shows an exemplary AMOLED subpixel unit cell circuit (2D-driving TFT circuit with subpixels). The driving area may include a driving transistor, switching transistor, holding capacitor, and reverse current sensor. FIG. 11B shows the reverse current read and amplified in the OLED circuit structure. Note that as shown in FIG. 11A, FIG. 11B and FIG. 12, Vdd represents a supply power voltage; Nsw represents a switch TFT; C1 represents a storage capacitor; Ndr represents a driver TFT which controls current based on charge of C1 capacitance; Vdata represents a data line; Vgg represents a gate voltage of Nsw; Vcom represents a common ground voltage; Vgs represents a gate to source voltage of driver TFT; Vdd1 represents a supply power of pixels for green or red light; and Vdd2 represents a supply power of pixels for blue light.

Figure 13:
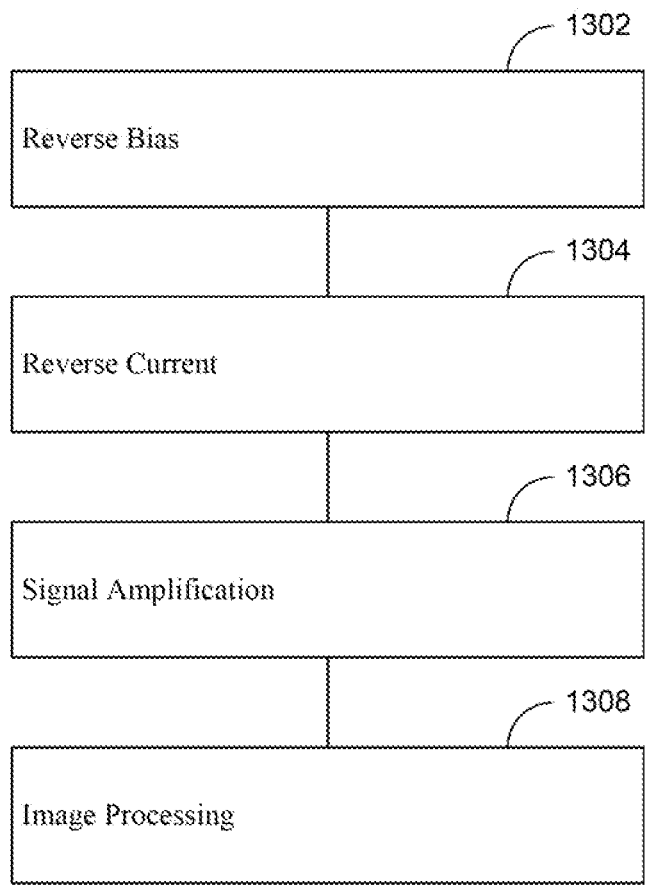
FIG. 13 illustrates a process of fingerprint acquisition using AMOLED according to aspects of the present disclosure.

In some embodiments, an AMOLED panel has a three-subpixel structure. In the subpixel structure, for example, a blue subpixel can be used as a light source while the neighboring green or red subpixels may be used as a sensor because the band gap of blue subpixels is larger than that of the green or red subpixels. FIG. 12 shows an exemplary R/G/B pixel structure where the blue subpixel is the light source, and the green or red subpixel is the sensor. The reverse voltage can be biased in the sensor subpixel when the lighting subpixel is turned on. In FIG. 11B, the I-V curves correspond with subpixel structures in FIG. 12. The amount of reverse current in the sensor subpixel under reverse bias is increased when light is reflected, refracted, or scattered from a fingerprint to the sensor subpixel. The amount of reverse current can be measured using current sensing circuits in the driving circuit area. The reverse current signal can be amplified using an amplification circuit, and/or a signal processor. The amplified current signal can then be processed to generate a fingerprint image by a signal processing algorithm (FIG. 13, algorithm flow chart).

The OLED panel resolution can be controlled by varying the size and density of each subpixel and by setting the subpixel structure of the OLED panel. For example, an OLED panel may have a larger lighting component (e.g. blue subpixels) and a smaller sensor component (e.g. green and/or red subpixels). According to aspects of the present disclosure, subpixel structures can have different sizes. The subpixel density can be enhanced by changing pixel shape from stripe type to circular or diamond shape. In addition, an OLED subpixel structure can have different shapes, such as square, rectangle, circle, diamond, etc. The patterning of the subpixel structure can be fabricated by using fine metal mask processes, ink-jet printing, or laser transfer technologies.

According to aspects of the present disclosure, a mobile device may be equipped with the fingerprint recognition apparatus of the present disclosure. As described herein, a mobile device may comprise a wireless transceiver which is capable of transmitting and receiving wireless signals via wireless antenna over a wireless communication network. Wireless transceiver may be connected to a bus by a wireless transceiver bus interface. The wireless transceiver bus interface may, in some embodiments be at least partially integrated with wireless transceiver. Some embodiments may include multiple wireless transceivers and wireless antennas to enable transmitting and/or receiving signals according to a corresponding multiple wireless communication standards such as, for example, versions of IEEE Std. 802.11, CDMA, WCDMA, LTE, UMTS, GSM, AMPS, Zigbee and Bluetooth®, etc.

The mobile device may also comprise a SPS receiver capable of receiving and acquiring SPS signals via a SPS antenna. The SPS receiver may also process, in whole or in part, acquired SPS signals for estimating a location of the mobile device. In some embodiments, processor(s), memory, DSP(s) and/or specialized processors (not shown) may also be utilized to process acquired SPS signals, in whole or in part, and/or calculate an estimated location of the mobile device, in conjunction with the SPS receiver. Storage of SPS or other signals for use in performing positioning operations may be performed in memory or registers (not shown).

In addition, the mobile device may comprise digital signal processor(s) (DSP(s)) connected to the bus by a bus interface, processor(s) connected to the bus by a bus interface and memory. The bus interface may be integrated with the DSP(s), processor(s) and memory. In various embodiments, functions may be performed in response execution of one or more machine-readable instructions stored in memory such as on a computer-readable storage medium, such as RAM, ROM, FLASH, or disc drive, just to name a few example. The one or more instructions may be executable by processor(s), specialized processors, or DSP(s). The memory may comprise a non-transitory processor-readable memory and/or a computer-readable memory that stores software code (programming code, instructions, etc.) that are executable by processor(s) and/or DSP(s) to perform functions described herein. In a particular implementation, the wireless transceiver may communicate with processor(s) and/or DSP(s) through the bus to enable the mobile device to be configured as a wireless station as discussed above. Processor(s) and/or DSP(s) may execute instructions to execute one or more aspects of processes/methods discussed above in connection with FIG. 1 to FIG. 13.

According to aspects of the present disclosure, a user interface may comprise any one of several devices such as, for example, a speaker, microphone, display device, vibration device, keyboard, touch screen, etc. In a particular implementation, the user interface may enable a user to interact with one or more applications hosted on the mobile device. For example, devices of user interface may store analog or digital signals on the memory to be further processed by DSP(s) or processor in response to action from a user. Similarly, applications hosted on the mobile device may store analog or digital signals on the memory to present an output signal to a user. In another implementation, the mobile device may optionally include a dedicated audio input/output (I/O) device comprising, for example, a dedicated speaker, microphone, digital to analog circuitry, analog to digital circuitry, amplifiers and/or gain control. In another implementation, the mobile device may comprise touch sensors responsive to touching or pressure on a keyboard or touch screen device.

The mobile device may also comprise a dedicated camera device for capturing still or moving imagery. The dedicated camera device may comprise, for example an imaging sensor (e.g., charge coupled device or CMOS imager), lens, analog to digital circuitry, frame buffers, etc. In one implementation, additional processing, conditioning, encoding or compression of signals representing captured images may be performed at the processor(s) or DSP(s). Alternatively, a dedicated video processor may perform conditioning, encoding, compression or manipulation of signals representing captured images. Additionally, the dedicated video processor may decode/decompress stored image data for presentation on a display device on the mobile device.

The mobile device may also comprise sensors coupled to the bus which may include, for example, inertial sensors and environment sensors. Inertial sensors may comprise, for example accelerometers (e.g., collectively responding to acceleration of the mobile device in three dimensions), one or more gyroscopes or one or more magnetometers (e.g., to support one or more compass applications). Environment sensors of the mobile device may comprise, for example, temperature sensors, barometric pressure sensors, ambient light sensors, and camera imagers, microphones, just to name few examples. The sensors may generate analog or digital signals that may be stored in memory and processed by DPS(s) or processor(s) in support of one or more applications such as, for example, applications directed to positioning or navigation operations.

In a particular implementation, the mobile device may comprise a dedicated modem processor capable of performing baseband processing of signals received and down-converted at a wireless transceiver or SPS receiver. Similarly, the dedicated modem processor may perform baseband processing of signals to be up-converted for transmission by the wireless transceiver. In alternative implementations, instead of having a dedicated modem processor, baseband processing may be performed by a processor or DSP (e.g., processor(s) or DSP(s)).

Figure 14:
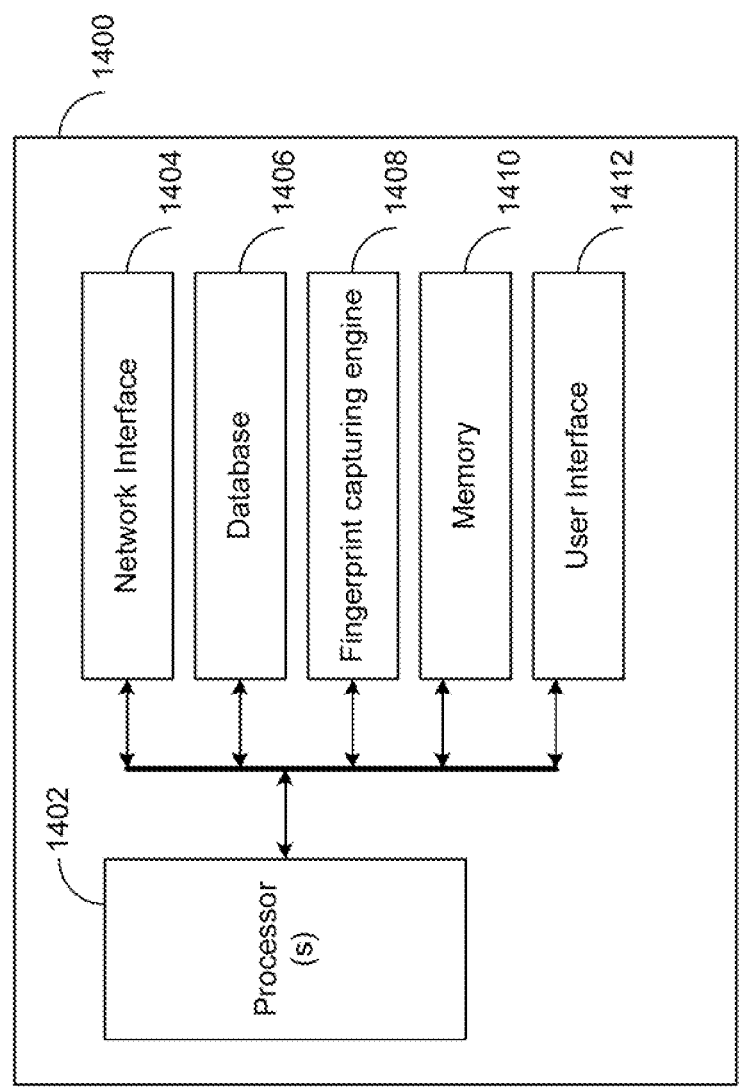
FIG. 14 illustrates an exemplary controller for capturing images of a fingerprint according to aspects of the present disclosure.

FIG. 14 illustrates an exemplary controller for capturing images of a fingerprint according to aspects of the present disclosure. As shown in FIG. 14, the controller 1400 may include one or more processor(s) 1402. The one or more processors may be communicatively coupled to network interface 1404, database 1406; fingerprint capturing engine 1408, memory 1410, and user interface 1412. According to aspects of the present disclosure, the controller may be configured to perform the methods and processes described above in association with FIG. 1 to FIG. 13.

It will be appreciated that the above descriptions for clarity have described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processors or controllers. Hence, references to specific functional units are to be seen as references to suitable means for providing the described functionality rather than indicative of a strict logical or physical structure or organization.

The invention can be implemented in any suitable form, including hardware, software, firmware, or any combination of these. The invention may optionally be implemented partly as computer software running on one or more data processors and/or digital signal processors. The elements and components of an embodiment of the invention may be physically, functionally, and logically implemented in any suitable way. Indeed, the functionality may be implemented in a single unit, in a plurality of units, or as part of other functional units. As such, the invention may be implemented in a single unit or may be physically and functionally distributed between different units and processors.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as suited to the particular use contemplated.

We claim:

1. A method of capturing images of a fingerprint, comprising:
   emitting light from a set of light sources to generate a scattered light from the fingerprint;
   determining a set of sensor arrays located between an inner boundary and an outer boundary from the set of light sources based on thickness and refractive index of one or more panels between the set of light sources and the fingerprint;

activating the set of sensor arrays to capture the scattered light from the fingerprint while excluding another set of sensor arrays located within the inner boundary from the set of light sources; and processing the scattered light captured by the set of sensor arrays in parallel to generate a topography of the fingerprint.

2. The method of claim 1 further comprises:

wherein the inner boundary and the outer boundary are determined based on empirical data of characteristics of ridges and valleys of fingerprints from a plurality of users.

3. The method of claim 1, wherein activating a set of sensor arrays to capture the scattered light from the fingerprint comprises:

setting one or more unit cells of a pixel panel in the set of sensor arrays under a reversed bias condition;

detecting a leakage current corresponding to the scattered light sensed in the one or more of the pixels or sub-pixels in the one or more unit cells of the pixel panel; and amplifying a signal of the leakage current detected from the one or more of the pixels or sub-pixels.

4. The method of claim 1, wherein processing the scattered light captured by the set of sensor arrays in parallel comprises:

for each sensor in the set of sensor arrays, performing pipelined operations to process the scattered light captured, wherein the pipelined operations comprises:

converting a signal of the leakage current detected from the one or more of the pixels or sub-pixels of a pixel panel from an analog value to a digital value using an analog-to-digital converter (ADC);

accumulating a value of light intensity at each sensor location; and storing the value of light intensity at each sensor location in a pixel array to form a part of the topography of the fingerprint.

5. The method of claim 4, further comprising:

emitting light from a next set of light sources to generate the scattered light from the fingerprint;

activating a next set of sensor arrays to capture the scattered light from the fingerprint;

processing the scattered light captured by the next set of sensor arrays to generate the topography of the fingerprint; and repeating above steps until all columns and rows of a scan area under the fingerprint have been covered.

6. The method of claim 5, further comprising:

analyzing an image quality of the scan area;

in response to the image quality of the scan area being lower than the threshold value, adjusting one or more scan parameters; and repeating above steps of calibration for the scan area.

7. The method of claim 6, wherein the adjusting one or more scan parameters is based on a number of layers of the one or more panels, thickness and refractive index of each layer of the one or more panels, an estimated width of the fingerprint valley, an estimated width of the fingerprint ridge, or some combination thereof.

8. The method of claim 6, wherein the one or more scan parameters comprises:

an inner boundary distance between the set of light sources and the set of sensor array;

an outer boundary distance between the set of light sources and the set of sensor array;

an intensity of the set of light sources;

sizes of the set of sensor arrays;

shapes of the set of sensor arrays;

or some combination thereof.

9. The method of claim 1, further comprises:

comparing the topography of the fingerprint to a database of fingerprints to authenticate the fingerprint.

10. An apparatus for capturing images of a fingerprint, comprising:

a pixel panel having a surface configured to be touched by a fingerprint;

a plurality of light sources for emitting light to the fingerprint;

a plurality of sensor arrays for sensing scattered light from the fingerprint;

a controller configured to generate control signals to:

emit light from a set of light sources in the plurality of light sources to generate a scattered light from the fingerprint;

determine a set of sensor arrays in the plurality of sensor arrays, located between an inner boundary and an outer boundary from the set of light sources, based on thickness and refractive index of one or more panels between the set of light sources and the fingerprint;

activate the set of sensor arrays to capture the scattered light from the fingerprint while excluding another set of sensor arrays in the plurality of sensor arrays located within the inner boundary from the set of light sources; and process the scattered light captured by the set of sensor arrays in parallel to generate a topography of the fingerprint.

11. The apparatus of claim 10, wherein the controller is further configured to:

determine the inner boundary and the outer boundary based on empirical data of characteristics of ridges and valleys of fingerprints from a plurality of users.

12. The apparatus of claim 10, wherein the controller is further configured to:

set one or more unit cells of a pixel panel in the set of sensor arrays under a reversed bias condition;

detect a leakage current corresponding to the scattered light sensed in the one or more of the pixels or sub-pixels in the one or more unit cells of the pixel panel; and amplify a signal of the leakage current detected from the one or more of the pixels or sub-pixels.

13. The apparatus of claim 10, wherein the controller is further configured to:

for each sensor in the set of sensor arrays, perform pipelined operations to process the scattered light captured, wherein the pipelined operations comprises:

convert a signal of the leakage current detected from the one or more of the pixels or sub-pixels of a pixel panel from an analog value to a digital value using an analog-to-digital converter (ADC);

accumulate a value of light intensity at each sensor location; and store the value of light intensity at each sensor location in a pixel array to form a part of the topography of the fingerprint.

14. The apparatus of claim 13, wherein the controller is further configured to:

emit light from a next set of light sources to generate the scattered light from the fingerprint;

activate a next set of sensor arrays to capture the scattered light from the fingerprint;

process the scattered light captured by the next set of sensor arrays to generate the topography of the fingerprint; and repeat above steps until all columns and rows of a scan area under the fingerprint have been covered.

15. The apparatus of claim 14, wherein the controller is further configured to:

analyze an image quality of the scan area;

in response to the image quality of the scan area being lower than the threshold value, adjust one or more scan parameters; and repeat above steps of calibration for the scan area.

16. The apparatus of claim 15, wherein adjust one or more scan parameters is based on a number of layers of the one or more panels, thickness and refractive index of each layer of the one or more panels, an estimated width of the fingerprint valley, an estimated width of the fingerprint ridge, or some combination thereof.

17. The apparatus of claim 15, wherein the one or more scan parameters comprises:

an inner boundary distance between the set of light sources and the set of sensor array;

an outer boundary distance between the set of light sources and the set of sensor array;

an intensity of the set of light sources;

sizes of the set of sensor arrays;

shapes of the set of sensor arrays;

or some combination thereof.

18. The apparatus of claim 10, wherein the controller is further configured to:

compare the topography of the fingerprint to a database of fingerprints to authenticate the fingerprint.

\* \* \* \* \*